(12) United States Patent
Aoki et al.

(10) Patent No.: US 12,279,053 B2
(45) Date of Patent: Apr. 15, 2025

(54) INFORMATION PROCESSING DEVICE, INFORMATION PROCESSING SYSTEM, INFORMATION PROCESSING METHOD, AND INFORMATION PROCESSING PROGRAM

(71) Applicant: Sony Group Corporation, Tokyo (JP)

(72) Inventors: Suguru Aoki, Tokyo (JP); Ryuta Satoh, Tokyo (JP); Keitaro Yamamoto, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 106 days.

(21) Appl. No.: 18/005,189

(22) PCT Filed: Jun. 22, 2021

(86) PCT No.: PCT/JP2021/023543
§ 371 (c)(1),
(2) Date: Jan. 12, 2023

(87) PCT Pub. No.: WO2022/019026
PCT Pub. Date: Jan. 27, 2022

(65) Prior Publication Data
US 2023/0269498 A1    Aug. 24, 2023

(30) Foreign Application Priority Data
Jul. 20, 2020    (JP) ................. 2020-123760

(51) Int. Cl.
*H04N 25/44* (2023.01)
*G06T 5/80* (2024.01)
*G06V 10/44* (2022.01)

(52) U.S. Cl.
CPC .............. *H04N 25/44* (2023.01); *G06T 5/80* (2024.01); *G06V 10/44* (2022.01)

(58) Field of Classification Search
CPC ........ H04N 25/44; H04N 23/81; H04N 25/61; H04N 25/40; G06T 5/80; G06V 10/44
See application file for complete search history.

(56) References Cited

U.S. PATENT DOCUMENTS 9,308,862 B2 *    4/2016    Fujita ................. H04N 23/631

FOREIGN PATENT DOCUMENTS

| JP | 2000125175 A | 4/2000 |
|---|---|---|
| JP | 2017-112409 A | 6/2017 |

(Continued)

OTHER PUBLICATIONS

International Search Report and Written Opinion mailed on Sep. 21, 2021, received for PCT Application PCT/JP2021/023543, filed on Jun. 22, 2021, 9 pages including English Translation.

*Primary Examiner* — Ahmed A Berhan
(74) *Attorney, Agent, or Firm* — XSENSUS LLP

(57) ABSTRACT

The present technology relates to an information processing device, an information processing system, and an information processing method which are capable of preventing a decrease in recognition rate of recognition processing even when nonlinear distortion dependent on a luminous flux distribution of an optical system occurs in a captured image. The information processing device includes a reading unit configured to set, as a reading pixel, a part of a pixel region in which a plurality of pixels is arranged in a two-dimensional array, and control reading of a pixel signal from a pixel included in the pixel region, and a correction unit configured to correct the read unit on the basis of a lens distortion parameter and cause the reading unit to read the pixel signal.

16 Claims, 28 Drawing Sheets

(56) References Cited

FOREIGN PATENT DOCUMENTS

| JP | 2019-159940 A | 9/2019 | |
|----|---------------|--------|---|
| WO | WO-2007108081 A1 * | 9/2007 | ............. G06T 5/006 |
| WO | 2020/027233 A1 | 2/2020 | |

* cited by examiner

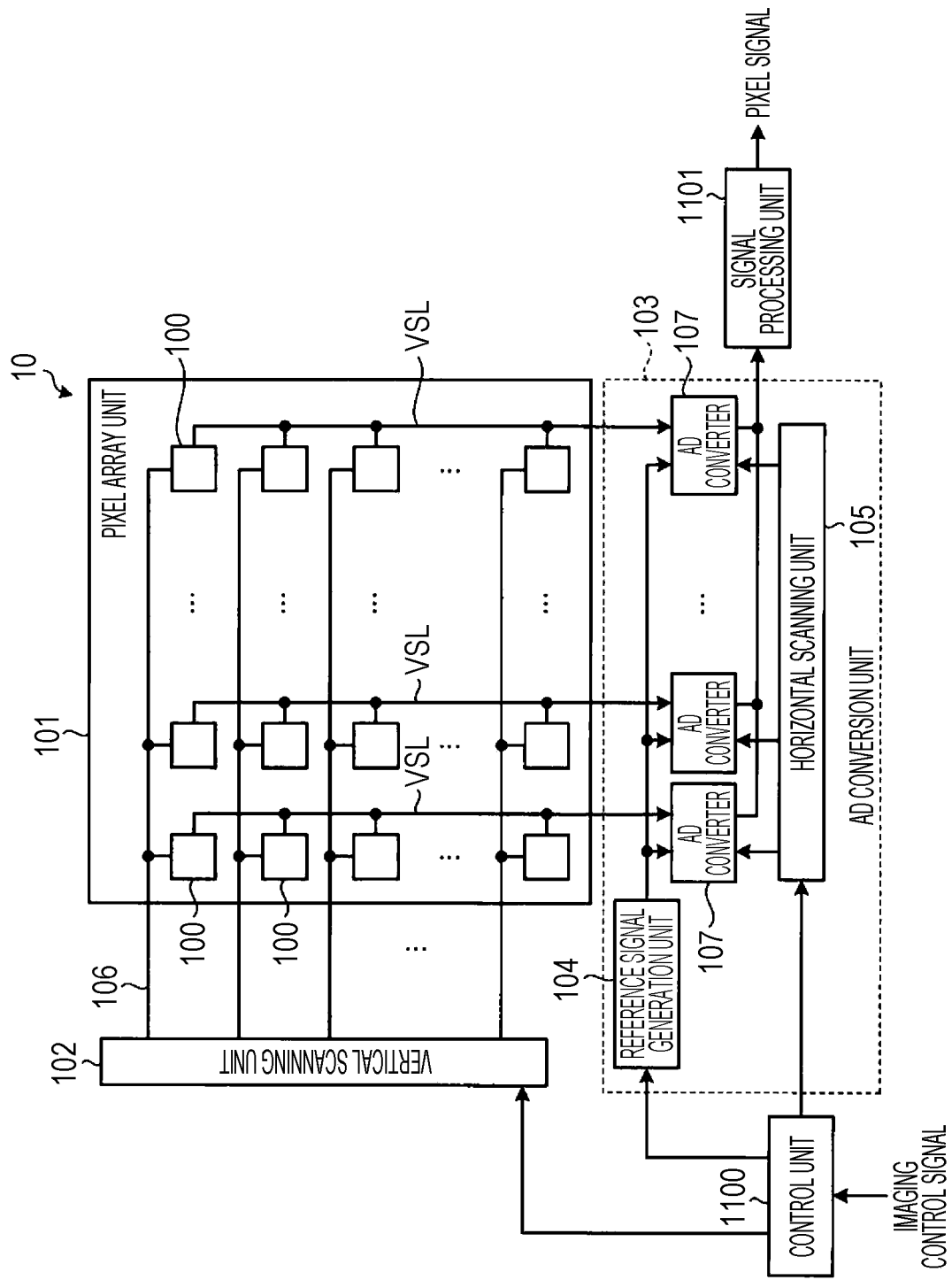

FIG. 29
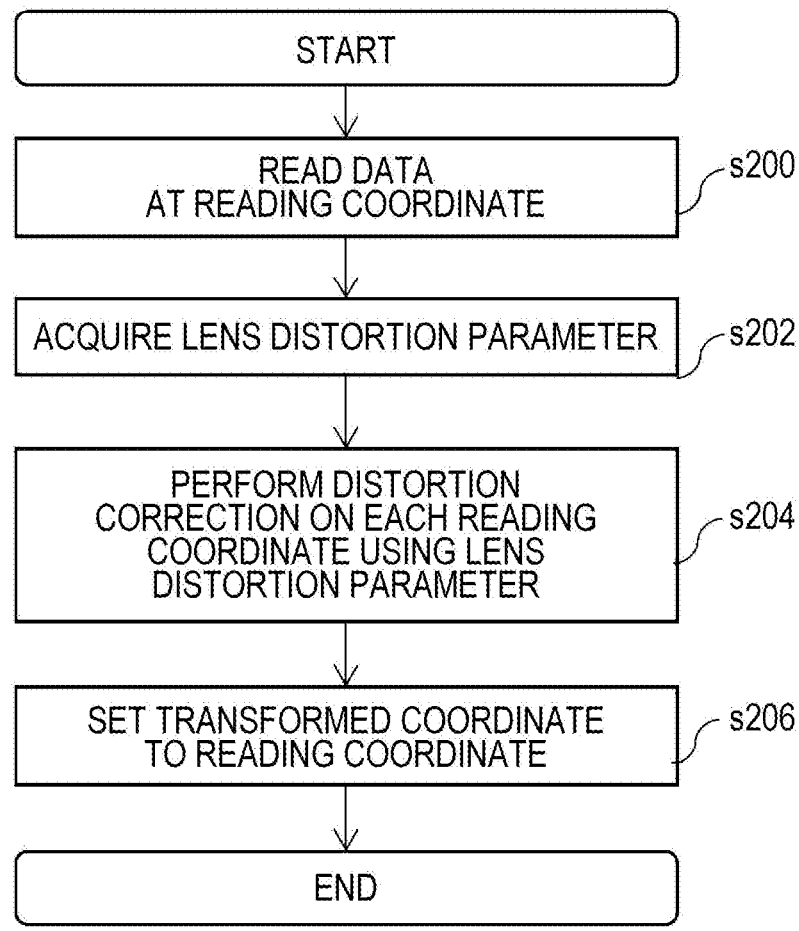
FIG. 30
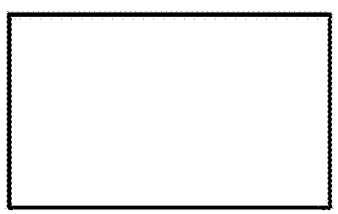    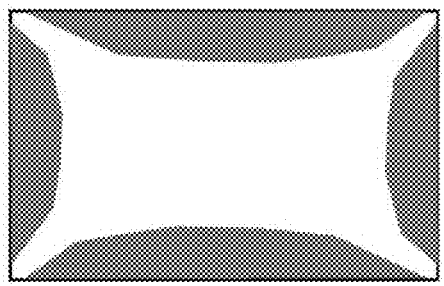
(a) READ (S140)                (b) CORRECT DISTORTION (S142)

INFORMATION PROCESSING DEVICE, INFORMATION PROCESSING SYSTEM, INFORMATION PROCESSING METHOD, AND INFORMATION PROCESSING PROGRAM

CROSS-REFERENCE TO RELATED APPLICATIONS

The present application is based on PCT filing PCT/JP2021/023543, filed Jun. 22,2021, which claims priority to JP 2020-123760, filed Jul. 20, 2020, the entire contents of each are incorporated herein by reference.

TECHNICAL FIELD

The present disclosure relates to an information processing device, an information processing system, an information processing method, and an information processing program.

BACKGROUND ART

In recent years, with an increase in functionality of imaging devices such as digital still cameras, digital video cameras, and small cameras mounted on multifunctional mobile phones (smartphones) and the like, information processing devices having an image recognition function of recognizing a predetermined object included in a captured image have been developed.

Nonlinear distortion depending on a light flux distribution of an optical system of the imaging device, however, occurs in image data captured through the optical system. Recognition processing on image data having such distortion may suffer a decrease in recognition rate.

CITATION LIST

Patent Document

Patent Document 1: Japanese Patent Application Laid-Open No. 2017-112409

SUMMARY OF THE INVENTION

Problems to be Solved by the Invention

An aspect of the present disclosure provides an information processing device, an information processing system, an information processing method, and an information processing program capable of preventing a decrease in recognition rate of recognition processing even when nonlinear distortion dependent on a luminous flux distribution of an optical system occurs in an image.

Solutions to Problems

In order to solve the above-described problems, an aspect of the present disclosure provides an information processing device including:

a reading unit configured to set, as a read unit, a part of a pixel region in which a plurality of pixels is arranged in a two-dimensional array, and control reading of a pixel signal from a pixel included in the pixel region; and a correction unit configured to correct the read unit on the basis of a lens distortion parameter and causes the reading unit to read the pixel signal.

The correction unit may correct the read unit by applying inverse transform of distortion correction to the read unit on the basis of the lens distortion parameter.

A feature calculation unit configured to calculate a feature on the basis of the pixel signal that has been corrected and read on the basis of the lens distortion parameter may be further provided.

A recognition processing execution unit configured to perform recognition processing on the basis of the feature may be further provided.

The correction unit may calculate a coordinate position obtained by correcting a linear coordinate sequence on the basis of the lens distortion parameter, and the reading unit may control reading of the pixel signal on the basis of the corrected coordinate position.

The correction unit may calculate a coordinate position obtained by correcting a subsampling coordinate group on the basis of the lens distortion parameter, and the reading unit may control reading of the pixel signal on the basis of the corrected coordinate position.

In order to solve the above-described problems, an aspect of the present disclosure provides an information processing device including:

a reading unit configured to set, as a reading pixel, a part of a pixel region in which a plurality of pixels is arranged in a two-dimensional array, and control reading of a pixel signal from a pixel included in the pixel region; and a second correction unit configured to correct coordinates of the pixel signal from the pixel included in the pixel region on the basis of a lens distortion parameter.

A recognition processing execution unit configured to perform recognition processing on the basis of the corrected pixel signal may be further provided.

The recognition processing unit may include a point-net type recognizer.

The second correction unit may supply, to the recognition processing execution unit, the corrected pixel signal corresponding to a range corresponding to each row of the pixel signal read by the reading unit.

In order to solve the above-described problems, an aspect of the present disclosure provides an information processing device including:

a reading unit configured to set, as a reading pixel, a part of a pixel region in which a plurality of pixels is arranged in a two-dimensional array, and control reading of a pixel signal from a pixel included in the pixel region; and a recognition processing execution unit including a plurality of recognizers learned according to a plurality of lenses, the recognition processing execution unit being configured to perform recognition processing on the basis of the read pixel signal, in which the recognition processing execution unit performs recognition processing using a recognizer according to imaging of the pixel signal.

The recognition processing unit may perform recognition processing using a recognizer corresponding to an optical system used for imaging of the pixel signal.

In order to solve the above-described problems, an aspect of the present disclosure provides an information processing system including:

a sensor unit in which a plurality of pixels is arranged in a two-dimensional array; and a recognition processing unit, in which the recognition processing unit includes:

a reading unit configured to set, as a reading pixel, a part of a pixel region of the sensor unit, and control reading of a pixel signal from a pixel included in the pixel region; and a correction unit configured to correct the read unit on the basis of a lens distortion parameter and causes the reading unit to read the pixel signal.

In order to solve the above-described problems, an aspect of the present disclosure provides an information processing system including:

a sensor unit in which a plurality of pixels is arranged in a two-dimensional array; and a recognition processing unit, in which the recognition processing unit includes:

a reading unit configured to set, as a reading pixel, a part of a pixel region in which a plurality of pixels is arranged in a two-dimensional array, and control reading of a pixel signal from a pixel included in the pixel region; and a second correction unit configured to correct coordinates of the pixel signal from the pixel included in the pixel region on the basis of a lens distortion parameter.

In order to solve the above-described problems, an aspect of the present disclosure provides an information processing system including:

a sensor unit in which a plurality of pixels is arranged in a two-dimensional array; and a recognition processing unit, in which the recognition processing unit includes:

a reading unit configured to set, as a reading pixel, a part of a pixel region in which a plurality of pixels is arranged in a two-dimensional array, and control reading of a pixel signal from a pixel included in the pixel region; and a recognition processing execution unit including a plurality of recognizers learned according to a plurality of lenses, the recognition processing execution unit being configured to perform recognition processing on the basis of the read pixel signal.

In order to solve the above-described problems, an aspect of the present disclosure provides an information processing method including:

a reading process of setting, as a read unit, a part of a pixel region in which a plurality of pixels is arranged in a two-dimensional array, and controlling reading of a pixel signal from a pixel included in the pixel region; and a correcting process of correcting the read unit on the basis of a lens distortion parameter and causing the reading unit to read the pixel signal.

In order to solve the above-described problems, an aspect of the present disclosure provides an information processing method including:

a reading process of setting, as a reading pixel, a part of a pixel region in which a plurality of pixels is arranged in a two-dimensional array, and controlling reading of a pixel signal from a pixel included in the pixel region; and a second correcting process of correcting coordinates of the pixel signal from the pixel included in the pixel region on the basis of a lens distortion parameter.

In order to solve the above-described problems, an aspect of the present disclosure provides an information processing method including:

a reading process of setting, as a reading pixel, a part of a pixel region in which a plurality of pixels is arranged in a two-dimensional array, and controlling reading of a pixel signal from a pixel included in the pixel region; and a recognition processing execution process of performing recognition processing on the basis of the read pixel signal with a plurality of recognizers learned according to a plurality of lenses, in which in the recognition processing execution process, recognition processing is performed using a recognizer according to imaging of the pixel signal.

In order to solve the above-described problems, an aspect of the present disclosure provides a program for causing a computer to execute:

a reading process of setting, as a read unit, a part of a pixel region in which a plurality of pixels is arranged in a two-dimensional array, and controlling reading of a pixel signal from a pixel included in the pixel region; and a correcting process of correcting the read unit on the basis of a lens distortion parameter and causing the reading unit to read the pixel signal.

In order to solve the above-described problems, an aspect of the present disclosure provides a program for causing a computer to execute:

a reading process of setting, as a reading pixel, a part of a pixel region in which a plurality of pixels is arranged in a two-dimensional array, and controlling reading of a pixel signal from a pixel included in the pixel region; and a second correcting process of correcting coordinates of the pixel signal from the pixel included in the pixel region on the basis of a lens distortion parameter.

In order to solve the above-described problems, an aspect of the present disclosure provides a program for causing a computer to execute:

a reading process of setting, as a reading pixel, a part of a pixel region in which a plurality of pixels is arranged in a two-dimensional array, and controlling reading of a pixel signal from a pixel included in the pixel region; and a recognition processing execution process of performing recognition processing on the basis of the read pixel signal by using a plurality of recognizers learned according to a plurality of lenses, in which in the recognition processing execution process, recognition processing is performed using a recognizer according to imaging of the pixel signal.

BRIEF DESCRIPTION OF DRAWINGS

FIG. 4 is a block diagram illustrating a configuration of an example of a sensor unit applicable to each embodiment.

FIG. 29 is a flowchart illustrating a flow of processing of a recognition processing unit.

FIG. 30 is a diagram illustrating conventional data that is processed in accordance with the processing flow illustrated in the upper part of FIG. 19.

MODE FOR CARRYING OUT THE INVENTION

Hereinafter, embodiments of an information processing device, an information processing system, an information processing method, and an information processing program will be described with reference to the drawings. Hereinafter, main components of the information processing device, the information processing system, the information processing method, and the information processing program will be mainly described, but the information processing device, the information processing system, the information processing method, and the information processing program may include components or functions that are not illustrated or described. The following description is not intended to exclude such components or functions that are not illustrated or described.

1. Configuration Example According to Each Embodiment of Present Disclosure

Figure 1:
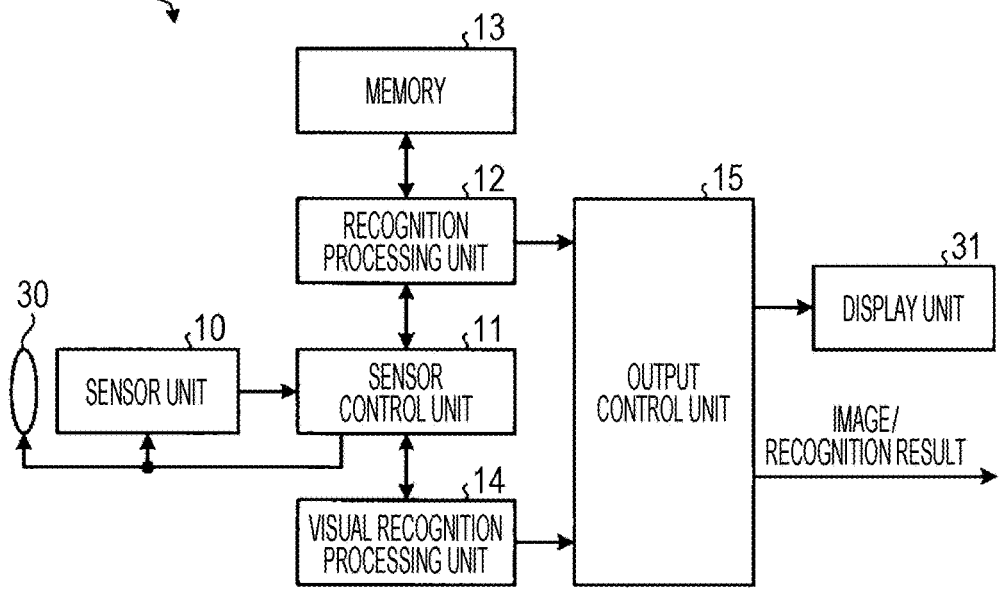
FIG. 1 is a block diagram illustrating a configuration of an example of an imaging device applicable to each embodiment of the present disclosure.

An overall configuration example of an information processing system according to each embodiment will be schematically described. FIG. 1 is a block diagram illustrating a configuration of an example of an information processing system 1. In FIG. 1, the information processing system 1 includes a sensor unit 10, a sensor control unit 11, a recognition processing unit 12, a memory 13, a visual recognition processing unit 14, and an output control unit 15. Each of the above-described units is, for example, a complementary metal oxide semiconductor (CMOS) image sensor (CIS) integrally formed using a CMOS. Note that the information processing system 1 is not limited to this example, and may be an optical sensor of another type such as an infrared optical sensor that captures an image with infrared light. Furthermore, the sensor control unit 11, the recognition processing unit 12, the memory 13, the visual recognition processing unit 14, and the output control unit 15 constitute an information processing device 2.

The sensor unit 10 outputs a pixel signal in accordance with light that impinges on a light receiving surface through an optical system of an optical unit 30. More specifically, the sensor unit 10 includes a pixel array in which pixels each including at least one photoelectric conversion element are arranged in a matrix. The light receiving surface is formed by each pixel arranged in a matrix in the pixel array. The sensor unit 10 further includes a drive circuit that drives each pixel included in the pixel array, and a signal processing circuit that performs predetermined signal processing on a signal read from each pixel and outputs the signal as a pixel signal of each pixel. The sensor unit 10 outputs the pixel signal of each pixel included in a pixel region as digital image data.

Hereinafter, in the pixel array included in the sensor unit 10, a region in which active pixels that each generate the pixel signal are arranged is referred to as a frame. Frame image data is formed by pixel data based on the pixel signal output from each pixel included in the frame. Furthermore, each row of the array of pixels of the sensor unit 10 is referred to as a line, and line image data is formed by pixel data based on the pixel signal output from each pixel included in the line. Moreover, an operation in which the sensor unit 10 outputs the pixel signal in accordance with the light that impinges on the light receiving surface is referred to as imaging. The sensor unit 10 controls an exposure at the time of imaging and a gain (analog gain) of the pixel signal in accordance with an imaging control signal supplied from the sensor control unit 11 to be described later.

The sensor control unit 11 includes, for example, a microprocessor, controls reading of the pixel data from the sensor unit 10, and outputs the pixel data based on the pixel signal read from each pixel included in the frame. The pixel data output from the sensor control unit 11 is supplied to the recognition processing unit 12 and the visual recognition processing unit 14.

Furthermore, the sensor control unit 11 generates the imaging control signal for controlling imaging in the sensor unit 10. The sensor control unit 11 generates the imaging control signal in accordance with, for example, instructions from the recognition processing unit 12 and the visual recognition processing unit 14 to be described later. The imaging control signal includes information indicating the exposure and the analog gain at the time of imaging in the sensor unit 10 described above. The imaging control signal further includes a control signal (a vertical synchronization signal, a horizontal synchronization signal, or the like.) that is used by the sensor unit 10 to perform an imaging operation. The sensor control unit 11 supplies the imaging control signal thus generated to the sensor unit 10.

The optical unit 30 is configured to cause light from a subject to impinge on the light receiving surface of the sensor unit 10, and is disposed at a position corresponding to the sensor unit 10, for example. The optical unit 30 includes, for example, a plurality of lenses, a diaphragm mechanism configured to adjust a size of an opening with respect to the incident light, and a focus mechanism configured to adjust a focal point of light that impinges on the light receiving surface. The optical unit 30 may further include a shutter mechanism (mechanical shutter) that adjusts a time during which light is incident on the light receiving surface. The diaphragm mechanism, the focus mechanism, and the shutter mechanism included in the optical unit 30 can be controlled by, for example, the sensor control unit 11. Alternatively, the diaphragm and the focus in the optical unit 30 can be controlled from the outside of the information processing system 1. Furthermore, the optical unit 30 can be integrated with the information processing system 1.

The recognition processing unit 12 performs, on the basis of the pixel data supplied from the sensor control unit 11, processing of recognizing an object included in the image based on the pixel data. In the present disclosure, for example, the recognition processing unit serving as a machine learning unit that performs the recognition processing using a deep neural network (DNN) is implemented by, for example, a digital signal processor (DSP) that load and execute a program corresponding to a learning model learned in advance using training data and stored in the memory 13. The recognition processing unit 12 can instruct the sensor control unit 11 to read, from the sensor unit 10, pixel data necessary for the recognition processing. A recognition result from the recognition processing unit is supplied to the output control unit 15.

The visual recognition processing unit 14 performs processing of obtaining an image that is easy for human to recognize supplied from the sensor control unit 11, and outputs image data including a group of pixel data, for example. For example, the visual recognition processing unit 14 is implemented by an image signal processor (ISP) that loads and executes a program prestored in a memory (not illustrated).

For example, in a case where a color filter is provided for each pixel included in the sensor unit 10, and the pixel data contains color information of red (R), green (G), and blue (B), the visual recognition processing unit 14 can perform demosaicing processing, white balance processing, and the like. Furthermore, the visual recognition processing unit 14 can instruct the sensor control unit 11 to read pixel data necessary for the visual recognition processing from the sensor unit 10. The image data obtained by performing the image processing on the pixel data by the visual recognition processing unit 14 is supplied to the output control unit 15.

The output control unit 15 includes, for example, a microprocessor, and outputs either or both of the recognition result supplied from the recognition processing unit 12 and the image data supplied as the visual recognition processing result from the visual recognition processing unit 14 to the outside of the information processing system 1. The output control unit 15 can output the image data to, for example, a display unit 31 including a display device. This allows the user to visually recognize the image data displayed by the display unit 31. Note that the display unit 31 may be built in the information processing system 1 or may be separate from the information processing system 1.

Figure 2A:
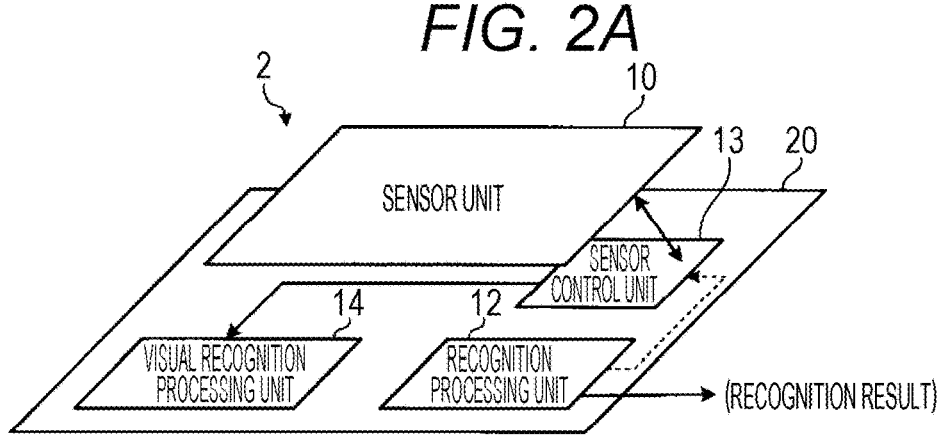
FIG. 2A is a schematic diagram illustrating an example of a hardware configuration of the imaging device according to each embodiment.
Figure 2B:
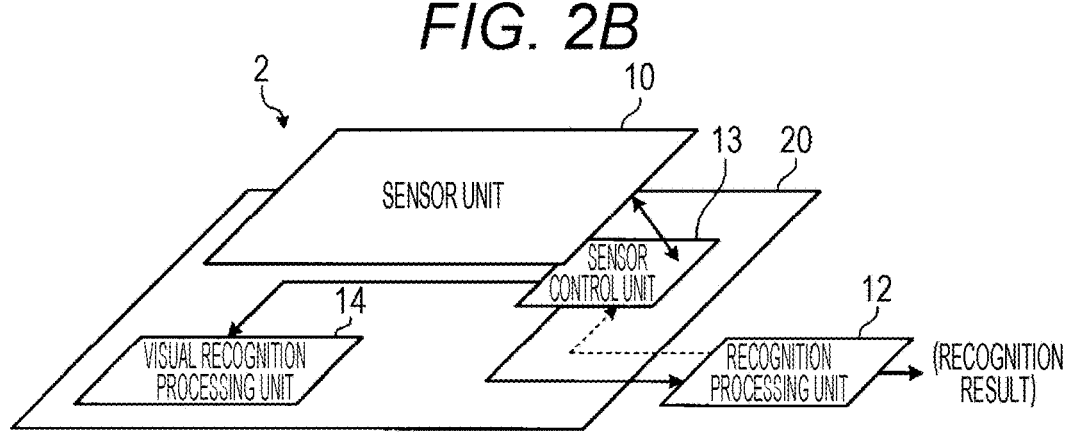
FIG. 2B is a schematic diagram illustrating an example of the hardware configuration of the imaging device according to each embodiment.

FIGS. 2A and 2B are schematic diagrams each illustrating an example of a hardware configuration of the information processing system 1 according to each embodiment. FIG. 2A illustrates an example where the sensor unit 10, the sensor control unit 11, the recognition processing unit 12, the memory 13, the visual recognition processing unit 14, and the output control unit 15 among the components illustrated in FIG. 1 are mounted on a single chip 2. Note that, in FIG. 2A, neither the memory 13 nor the output control unit 15 is illustrated for the sake of simplicity.

With the configuration illustrated in FIG. 2A, the recognition result from the recognition processing unit 12 is output to the outside of the chip 2 via the output control unit 15 (not illustrated). Furthermore, with the configuration illustrated in FIG. 2A, the recognition processing unit 12 can acquire pixel data to be used for recognition from the sensor control unit 11 via an interface inside the chip 2.

FIG. 2B illustrates an example where the sensor unit 10, the sensor control unit 11, the visual recognition processing unit 14, and the output control unit 15 among the components illustrated in FIG. 1 are mounted on the single chip 2, and the recognition processing unit 12 and the memory 13 (not illustrated) are installed outside the chip 2. Also in FIG. 2B, as in FIG. 2A described above, neither the memory 13 nor the output control unit 15 is illustrated for the sake of simplicity.

With the configuration illustrated in FIG. 2B, the recognition processing unit 12 acquires pixel data to be used for recognition via an interface responsible for performing chip-to-chip communication. Furthermore, in FIG. 2B, the recognition result is directly output from the recognition processing unit 12 to the outside, but how to output the recognition result is not limited to this example. That is, with the configuration illustrated in FIG. 2B, the recognition processing unit 12 may return the recognition result to the chip 2 to cause the output control unit 15 (not illustrated) mounted on the chip 2 to output the recognition result.

With the configuration illustrated in FIG. 2A, the recognition processing unit 12 is mounted on the chip 2 together with the sensor control unit 11, so as to allow high-speed communication between the recognition processing unit 12 and the sensor control unit 11 via an interface inside the chip 2. On the other hand, with the configuration illustrated in FIG. 2A, the recognition processing unit 12 cannot be replaced, and it is therefore difficult to change the recognition processing. On the other hand, with the configuration illustrated in FIG. 2B, since the recognition processing unit 12 is provided outside the chip 2, the communication between the recognition processing unit 12 and the sensor control unit 11 needs to be performed via an interface between chips. This makes the communication between the recognition processing unit 12 and the sensor control unit 11 slow as compared with the configuration illustrated in FIG. 2A, and there is a possibility that a delay occurs in control. On the other hand, the recognition processing unit 12 can be easily replaced, so that various types of recognition processing can be implemented.

Hereinafter, unless otherwise specified, it is assumed that the information processing system 1 has a configuration in which the sensor unit 10, the sensor control unit 11, the recognition processing unit 12, the memory 13, the visual recognition processing unit 14, and the output control unit 15 are mounted on the single chip 2 as illustrated in FIG. 2A.

With the configuration illustrated in FIG. 2A described above, the information processing system 1 can be implemented on one board. Alternatively, the information processing system 1 may be a stacked CIS in which a plurality of semiconductor chips is stacked into a single body.

Figure 3A:
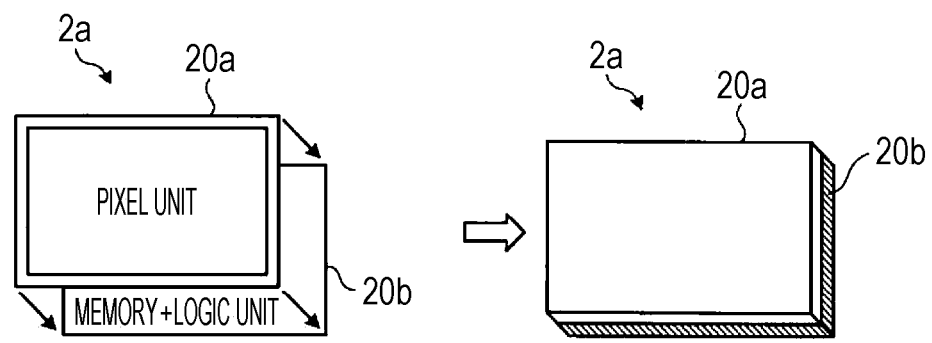
FIG. 3A is a diagram illustrating an example in which the imaging device according to each embodiment is formed by a stacked CIS having a two-layer structure.

As an example, the information processing system 1 can be implemented with a two-layer structure in which semiconductor chips are stacked in two layers. FIG. 3A is a diagram illustrating an example in which the information processing system 1 according to each embodiment is implemented by a stacked CIS having a two-layer structure. With the structure illustrated in FIG. 3A, a pixel unit 20a is implemented on a semiconductor chip of the first layer, and a memory+logic unit 20b is implemented on a semiconductor chip of the second layer. The pixel unit 20a includes at least the pixel array in the sensor unit 10. The memory+logic unit 20b includes, for example, the sensor control unit 11, the recognition processing unit 12, the memory 13, the visual recognition processing unit 14, the output control unit 15, and the interface responsible for performing communication between the information processing system 1 and the outside. The memory+logic unit 20b further includes a part or all of the drive circuit that drives the pixel array in the sensor unit 10. Furthermore, although not illustrated, the memory+logic unit 20b can further include, for example, a memory that is used for the visual recognition processing unit 14 to process image data.

As illustrated on the right side of FIG. 3A, the information processing system 1 is configured as a single solid state image sensor obtained by bonding the semiconductor chip of the first layer and the semiconductor chip of the second layer together with both the semiconductor chips in electrical contact with each other.

Figure 3B:
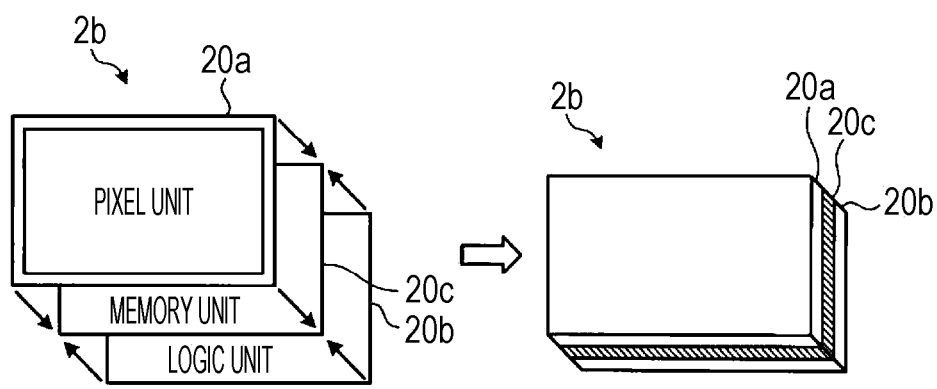
FIG. 3B is a diagram illustrating an example in which the imaging device according to each embodiment is formed by a stacked CIS having a three-layer structure.

Alternatively, the information processing system 1 can be implemented with a three-layer structure in which semiconductor chips are stacked in three layers. FIG. 3B is a diagram illustrating an example in which the information processing system 1 according to each embodiment is implemented by a stacked CIS having a three-layer structure. With the structure illustrated in FIG. 3B, the pixel unit 20a is implemented on the semiconductor chip of the first layer, a memory unit 20c is implemented on the semiconductor chip of the second layer, and the logic unit 20b' is implemented on the semiconductor chip of the third layer. In this case, the logic unit 20b' includes, for example, the sensor control unit 11, the recognition processing unit 12, the visual recognition processing unit 14, the output control unit 15, and the interface responsible for performing communication between the information processing system 1 and the outside. Furthermore, the memory unit 20c can include the memory 13 and, for example, a memory that is used for the visual recognition processing unit 14 to process image data. The memory 13 may be included in the logic unit 20b'.

As illustrated on the right side of FIG. 3B, the information processing system 1 is configured as a single solid state image sensor obtained by bonding the semiconductor chip of the first layer, the semiconductor chip of the second layer, and the semiconductor chip of the third layer together with all the semiconductor chip in electrical contact with each other.

FIG. 4 is a block diagram illustrating a configuration of an example of the sensor unit 10 applicable to each embodiment. In FIG. 4, the sensor unit 10 includes a pixel array unit 101, a vertical scanning unit 102, an analog to digital (AD) conversion unit 103, a pixel signal line 106, a vertical signal line VSL, a control unit 1100, and a signal processing unit 1101. Note that, in FIG. 4, the control unit 1100 and the signal processing unit 1101 can also be included in the sensor control unit 11 illustrated in FIG. 1, for example.

The pixel array unit 101 includes a plurality of pixel circuits 100 each including, for example, a photoelectric conversion element including a photodiode that performs photoelectric conversion on received light, and a circuit that reads an electric charge from the photoelectric conversion element. In the pixel array unit 101, the plurality of pixel circuits 100 is arranged in a matrix in a horizontal direction (row direction) and a vertical direction (column direction). In the pixel array unit 101, an arrangement of the pixel circuits 100 in the row direction is referred to as a line. For example, in a case where an image of one frame is formed with 1920 pixels*1080 lines, the pixel array unit 101 includes at least 1080 lines each including at least 1920 pixel circuits 100. An image (image data) of one frame is formed by pixel signals read from the pixel circuits 100 included in the frame.

Hereinafter, the operation of reading the pixel signal from each pixel circuit 100 included in the frame in the sensor unit 10 will be referred to as reading the pixel from the frame as needed. Furthermore, the operation of reading the pixel signal from each pixel circuit 100 in each line included in the frame will be referred to as, for example, reading the line as needed.

Furthermore, in the pixel array unit 101, the pixel signal line 106 is provided for each row to connect to each pixel circuit 100, and the vertical signal line VSL is provided for each column to connect to each pixel circuit 100. An end of the pixel signal line 106 that is not connected to the pixel array unit 101 is connected to the vertical scanning unit 102. The vertical scanning unit 102 transmits, under the control of the control unit 1100 to be described later, a control signal such as a drive pulse for reading the pixel signal from each pixel to the pixel array unit 101 over the pixel signal line 106. An end of the vertical signal line VSL that is not connected to the pixel array unit 101 is connected to the AD conversion unit 103. The pixel signal read from each pixel is transmitted to the AD conversion unit 103 over the vertical signal line VSL.

How to control the reading of the pixel signal from each pixel circuit 100 will be schematically described. The reading of the pixel signal from each pixel circuit 100 is performed by transferring the electric charge stored in the photoelectric conversion element by exposure to a floating diffusion layer (FD) and converting the electric charge transferred to floating diffusion into a voltage. The voltage obtained by converting the electric charge in the floating diffusion layer is output to the vertical signal line VSL via an amplifier.

More specifically, in the pixel circuit 100, during exposure, the photoelectric conversion element and the floating diffusion layer are in an off (open) state, so that the electric charge generated in accordance with incident light by photoelectric conversion is stored in the photoelectric conversion element. After the end of exposure, the floating diffusion layer and the vertical signal line VSL are connected in accordance with a selection signal supplied over the pixel signal line 106. Further, the floating diffusion layer is connected to a feed line of a power supply voltage VDD or a black level voltage for a short period of time in accordance with a reset pulse supplied over the pixel signal line 106, and the floating diffusion layer is reset accordingly. A voltage (referred to as a voltage A) at the reset level of the floating diffusion layer is output to the vertical signal line VSL. Thereafter, the photoelectric conversion element and the floating diffusion layer are brought into an on (closed) state in accordance with a transfer pulse supplied over the pixel signal line 106, so as to transfer the electric charge stored in the photoelectric conversion element to the floating diffusion layer. A voltage (referred to as a voltage B) corresponding to the amount of electric charge of the floating diffusion layer is output to the vertical signal line VSL.

The AD conversion unit 103 includes an AD converter 107 provided for each vertical signal line VSL, a reference signal generation unit 104, and a horizontal scanning unit 105. The AD converter 107 is a column AD converter that performs AD conversion processing on each column of the pixel array unit 101. The AD converter 107 performs AD conversion processing on the pixel signal supplied from each pixel circuit 100 over the vertical signal line VSL to generate two digital values (values corresponding to the voltage A and the voltage B) for correlated double sampling (CDS) processing that is performed to reduce noise.

The AD converter 107 supplies the two digital values thus generated to the signal processing unit 1101. The signal processing unit 1101 performs the CDS processing on the basis of the two digital values supplied from the AD converter 107 to generate a digital pixel signal (pixel data). The pixel data generated by the signal processing unit 1101 is output to the outside of the sensor unit 10.

The reference signal generation unit 104 generates, on the basis of the control signal input from the control unit 1100, a ramp signal that is used for each AD converter 107 to convert the pixel signal into two digital values, the ramp signal serving as a reference signal. The ramp signal is a signal whose level (voltage value) decreases linearly with respect to time, or a signal whose level decreases stepwise. The reference signal generation unit 104 supplies the ramp signal thus generated to each AD converter 107. The reference signal generation unit 104 includes, for example, a digital-to-analog converter (DAC) or the like.

When the ramp signal whose voltage decreases stepwise at a predetermined gradient is supplied from the reference signal generation unit 104, a counter start to count in accordance with a clock signal. A comparator compares the voltage of the pixel signal supplied from the vertical signal line VSL with the voltage of the ramp signal, and stops the counter from counting at timing when the voltage of the ramp signal exceeds the voltage of the pixel signal. The AD converter 107 converts an analog pixel signal into a digital value by outputting a value corresponding to the count value when the counting is stopped.

The AD converter 107 supplies the two digital values thus generated to the signal processing unit 1101. The signal processing unit 1101 performs the CDS processing on the basis of the two digital values supplied from the AD converter 107 to generate a digital pixel signal (pixel data). The digital pixel signal generated by the signal processing unit 1101 is output to the outside of the sensor unit 10.

The horizontal scanning unit 105 performs, under the control of the control unit 1100, selective scanning to select each AD converter 107 in a predetermined order, so as to sequentially output each digital value temporarily held by each AD converter 107 to the signal processing unit 1101. The horizontal scanning unit 105 includes, for example, a shift register, an address decoder, or the like.

The control unit 1100 performs drive control on the vertical scanning unit 102, the AD conversion unit 103, the reference signal generation unit 104, the horizontal scanning unit 105, and the like in accordance with the imaging control signal supplied from the sensor control unit 11. The control unit 1100 generates various drive signals, on the basis of which the vertical scanning unit 102, the AD conversion unit 103, the reference signal generation unit 104, and the horizontal scanning unit 105 operates. The control unit 1100 generates a control signal that is supplied from the vertical scanning unit 102 to each pixel circuit 100 over the pixel signal line 106 on the basis of, for example, the vertical synchronization signal or an external trigger signal included in the imaging control signal, and the horizontal synchronization signal. The control unit 1100 supplies the control signal thus generated to the vertical scanning unit 102.

Furthermore, the control unit 1100 outputs, for example, information indicating the analog gain included in the imaging control signal supplied from the sensor control unit 11 to the AD conversion unit 103. The AD conversion unit 103 controls, in accordance with the information indicating the analog gain, a gain of the pixel signal input to each AD converter 107 included in the AD conversion unit 103 over the vertical signal line VSL.

The vertical scanning unit 102 supplies, on the basis of the control signal supplied from the control unit 1100, various signals including the drive pulse to the pixel signal line 106 of the selected pixel row of the pixel array unit 101, that is, to each pixel circuit 100 per line, so as to cause each pixel circuit 100 to output the pixel signal to the vertical signal line VSL. The vertical scanning unit 102 includes, for example, a shift register, an address decoder, or the like. Furthermore, the vertical scanning unit 102 controls the exposure of each pixel circuit 100 in accordance with information indicating exposure supplied from the control unit 1100.

The sensor unit 10 configured as described above is a column AD type complementary metal oxide semiconductor (CMOS) image sensor in which the AD converter 107 is disposed for each column.

2. Example of Existing Technology Applicable to Present Disclosure

Prior to describing each embodiment according to the present disclosure, an existing technology applicable to the present disclosure will be schematically described for easy understanding.

(2-1. Outline of Rolling Shutter)

Figure 5A:
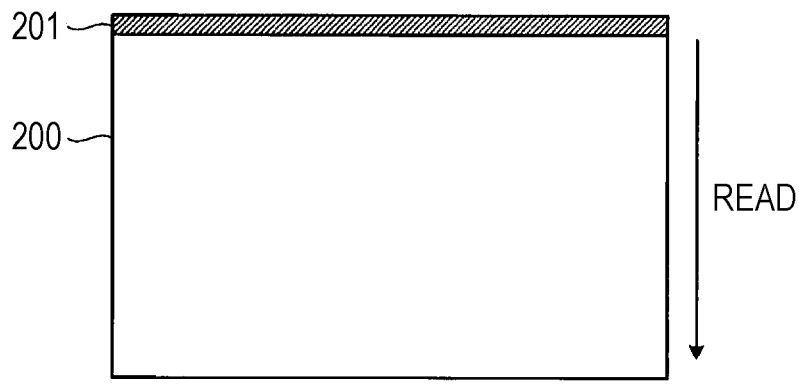
FIG. 5A is a schematic diagram for describing a rolling shutter method.
Figure 5B:
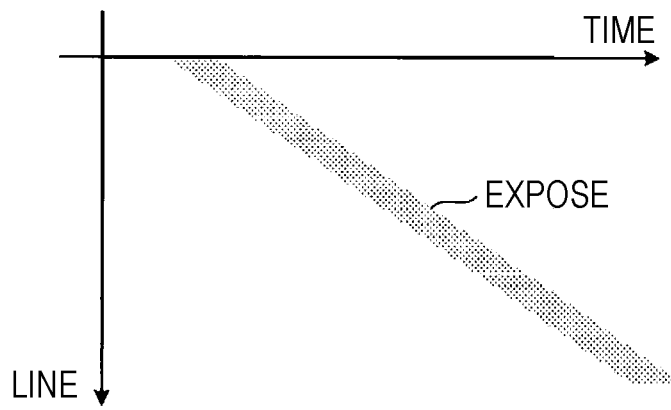
FIG. 5B is a schematic diagram for describing the rolling shutter method.
Figure 5C:
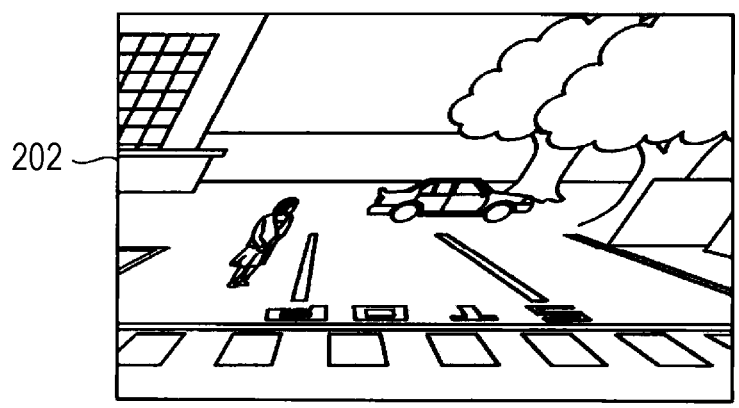
FIG. 5C is a schematic diagram for describing the rolling shutter method.

As an imaging method applied to imaging by the pixel array unit 101, a rolling shutter (RS) method and a global shutter (GS) method are known. First, the rolling shutter method will be schematically described. FIGS. 5A, 5B, and 5C are schematic diagrams for describing the rolling shutter method. Under the rolling shutter method, as illustrated in FIG. 5A, imaging is sequentially performed on a line-by-line basis from a line 201 at an upper end of a frame 200, for example.

Note that "imaging" has been described above to refer to the operation in which the sensor unit 10 outputs the pixel signal in accordance with the light incident on the light receiving surface. More specifically, "imaging" refers to a series of operations from the exposure of the pixel to the transfer of the pixel signal based on the electric charge stored by the exposure in the photoelectric conversion element included in the pixel to the sensor control unit 11. Furthermore, as described above, the frame refers to a region in which active pixel circuits 100 that each generate the pixel signal are arranged in the pixel array unit 101.

For example, with the configuration illustrated in FIG. 4, the pixel circuits 100 included in one line are simultaneously exposed. After the end of the exposure, the pixel circuits 100 included in the line simultaneously transfer the pixel signal based on the electrical charge stored by the exposure over their respective vertical signal lines VSL. Sequentially performing the above-described operation on a line-by-line basis achieves imaging by rolling shutter.

FIG. 5B schematically illustrates an example of a relation between imaging and time under the rolling shutter method. In FIG. 5B, the vertical axis represents a line position, and the horizontal axis represents time. Under the rolling shutter method, the exposure is performed on a line-by-line basis, so that, as illustrated in FIG. 5B, exposure timing of each line is shifted as the line position changes. Therefore, for example, in a case where a positional relation between the information processing system 1 and the subject in the horizontal direction rapidly changes, distortion is produced in the image obtained by capturing the frame 200 as illustrated in FIG. 5C. In the example illustrated in FIG. 5C, an image 202 corresponding to the frame 200 becomes tilted at an angle corresponding to a speed and direction of change in the positional relation between the information processing system 1 and the subject in the horizontal direction.

Figure 6A:
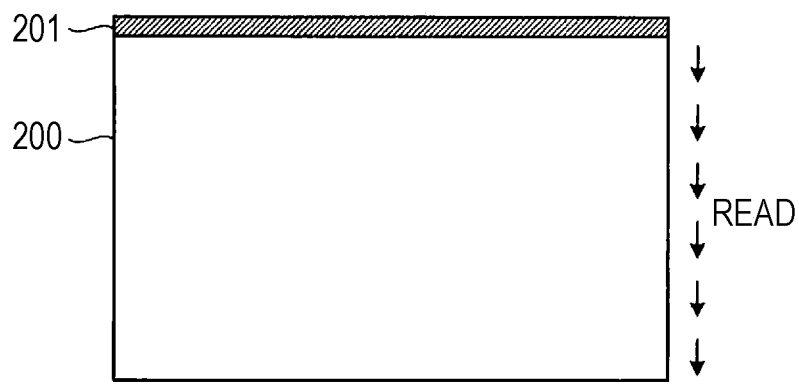
FIG. 6A is a schematic diagram for describing line skipping under the rolling shutter method.
Figure 6B:
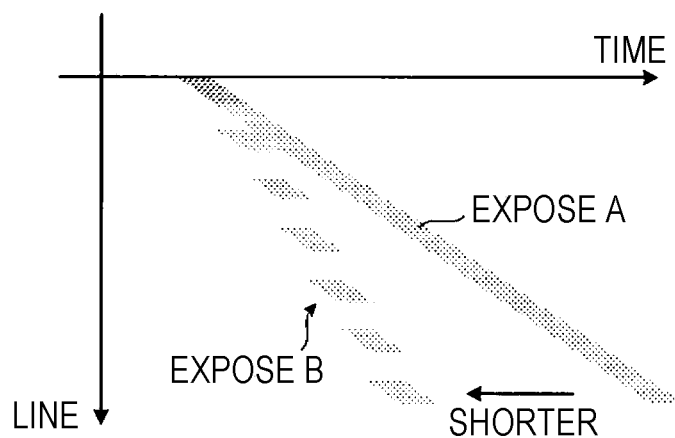
FIG. 6B is a schematic diagram for describing line skipping under the rolling shutter method.
Figure 6C:
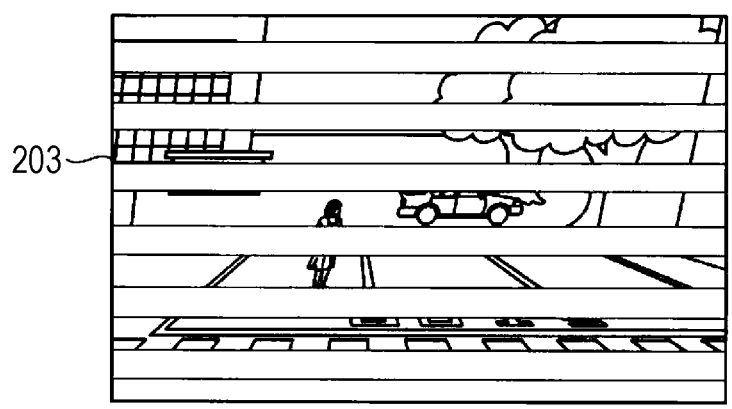
FIG. 6C is a schematic diagram for describing line skipping under the rolling shutter method.

Under the rolling shutter method, it is also possible to perform imaging with some lines skipped. FIGS. 6A, 6B, and 6C are schematic diagrams for describing line skipping under the rolling shutter method. As illustrated in FIG. 6A, as in the example illustrated in FIG. 5A described above, imaging is performed on a line-by-line basis from the line 201 at the upper end of the frame 200 toward a lower end of the frame 200. At this time, imaging is performed while skipping every predetermined number of lines.

Here, for the description, it is assumed that imaging is performed every other line, that is, while skipping every other line. That is, after the n-th line is imaged, the (n+2)-th line is imaged. At this time, it is assumed that a time from the imaging of the n-th line to the imaging of the (n+2)-th line is equal to a time from the imaging of the n-th line to the imaging of the (n+1)-th line in a case where skipping is not performed.

FIG. 6B schematically illustrates an example of a relation between imaging and time in a case where one-line skipping is performed under the rolling shutter method. In FIG. 6B, the vertical axis represents a line position, and the horizontal axis represents time. In FIG. 6B, exposure A corresponds to the exposure in FIG. 5B in which no skipping is performed, and exposure B indicates exposure in a case where one-line skipping is performed. The exposure B shows that performing line skipping makes it possible to reduce a difference in exposure timing at the same line position as compared with a case where no line skipping is performed. Therefore, as illustrated as an image 203 in FIG. 6C, distortion produced along the direction in the image obtained by capturing the frame 200 is tilted is smaller than distortion produced in a case where the line skipping illustrated in FIG. 5C is not performed. On the other hand, a case where line skipping is performed makes the image resolution lower than in a case where no line skipping is performed.

Figure 7A:
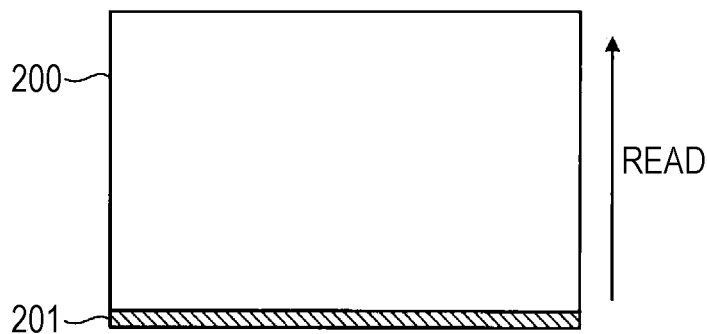
FIG. 7A is a diagram schematically illustrating an example of another imaging method under the rolling shutter method.
Figure 7B:
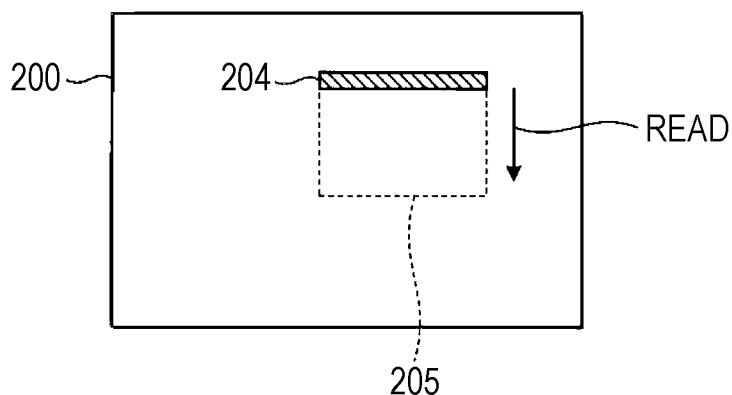
FIG. 7B is a diagram schematically illustrating an example of another imaging method under the rolling shutter method.

A description has been given above of an example in which imaging is performed on a line-by-line basis from the upper end to the lower end of the frame 200 under the rolling shutter method, but how to perform imaging is not limited to this example. FIGS. 7A and 7B are diagrams schematically illustrating an example of another imaging method under the rolling shutter method. For example, as illustrated in FIG. 7A, under the rolling shutter method, imaging can be performed on a line-by-line basis from the lower end to the upper end of the frame 200. In this case, the horizontal distortion of the image 202 becomes opposite in direction to a case where the imaging is performed on a line-by-line basis from the upper end to the lower end of the frame 200.

Furthermore, for example, it is also possible to set a range of the vertical signal line VSL over which the pixel signal is transferred, so as to allow a part of the line to be selectively read. Moreover, it is also possible to set the line used for imaging and the vertical signal line VSL used for transferring the pixel signal, so as to allow the first imaging line and the last imaging line to be set other than the upper end and the lower end of the frame 200. FIG. 7B schematically illustrates an example in which a rectangular region 205 that is less in width and height than the frame 200 is set as an imaging range. In the example illustrated in FIG. 7B, imaging is performed on a line-by-line basis from a line 204 at the upper end of the region 205 toward the lower end of the region 205.

(2-2. Overview of Global Shutter)

Figure 8A:
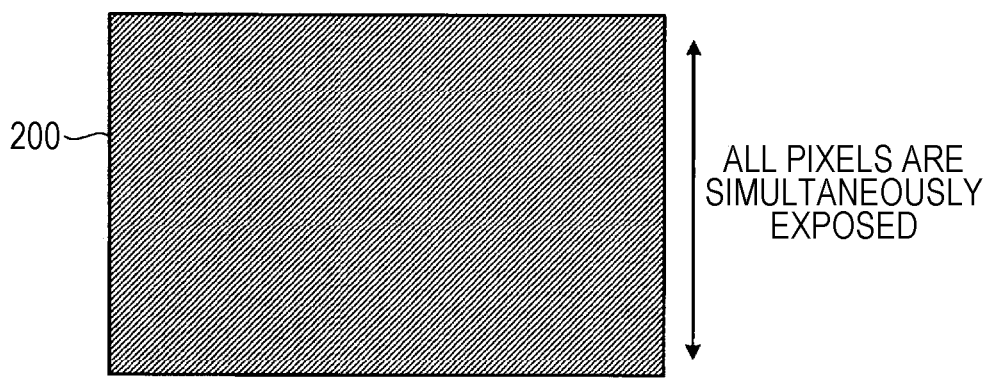
FIG. 8A is a schematic diagram for describing a global shutter method.
Figure 8B:
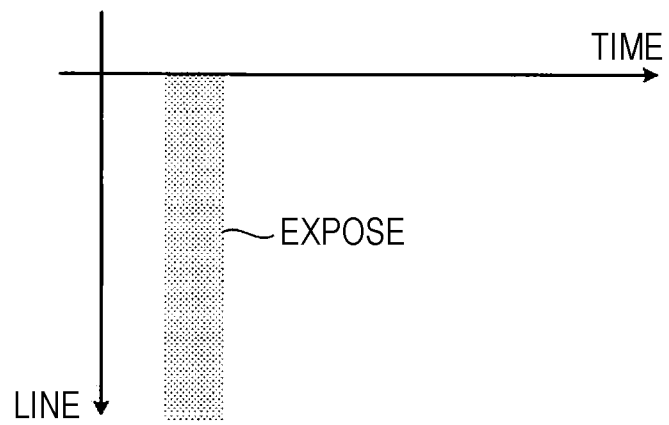
FIG. 8B is a schematic diagram for describing the global shutter method.
Figure 8C:
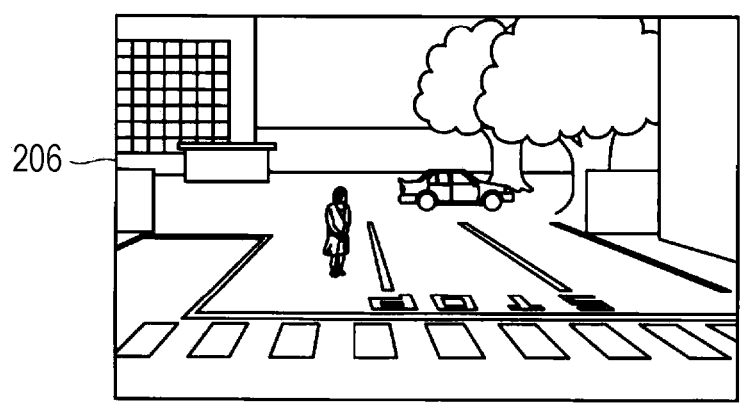
FIG. 8C is a schematic diagram for describing the global shutter method.

Next, as an imaging method applied to imaging by the pixel array unit 101, a global shutter (GS) method will be schematically described. FIGS. 8A, 8B, and 8C are schematic diagrams for describing the global shutter method. Under the global shutter method, as illustrated in FIG. 8A, all the pixel circuits 100 included in the frame 200 are simultaneously exposed.

In a case where the global shutter method is applied to the configuration illustrated in FIG. 4, a configuration is conceivable as an example in which a capacitor is further provided between the photoelectric conversion element and the FD in each pixel circuit 100. Then, a first switch is provided between the photoelectric conversion element and the capacitor, and a second switch is provided between the capacitor and the floating diffusion layer, and the opening and closing of each of the first and second switches is controlled in accordance with a pulse supplied over the pixel signal line 106.

In such a configuration, the first and second switches in all the pixel circuits 100 included in the frame 200 are in the open state during exposure, and the end of the exposure brings the first switch into the closed state from the open state to transfer the electric charge from the photoelectric conversion element to the capacitor. Thereafter, the capacitor is regarded as a photoelectric conversion element, and the electric charge is read from the capacitor in a similar manner to the reading operation under the rolling shutter method described above. This allows simultaneous exposure of all the pixel circuits 100 included in the frame 200.

FIG. 8B schematically illustrates an example of a relation between imaging and time under the global shutter method. In FIG. 8B, the vertical axis represents a line position, and the horizontal axis represents time. Under the global shutter method, all the pixel circuits 100 included in the frame 200 are simultaneously exposed, so that the exposure timing can be the same among the lines as illustrated in FIG. 8B. Therefore, for example, even in a case where a positional relation between the information processing system 1 and the subject in the horizontal direction rapidly changes, no distortion is produced in an image 206 obtained by capturing the frame 200 as illustrated in FIG. 8C.

The global shutter method can ensure that all the pixel circuits 100 included in the frame 200 are simultaneously exposed. Therefore, controlling the timing of each pulse supplied over the pixel signal line 106 of each line and the timing of transfer over each vertical signal line VSL makes it possible to achieve sampling (reading of pixel signals) in various patterns.

Figure 9A:
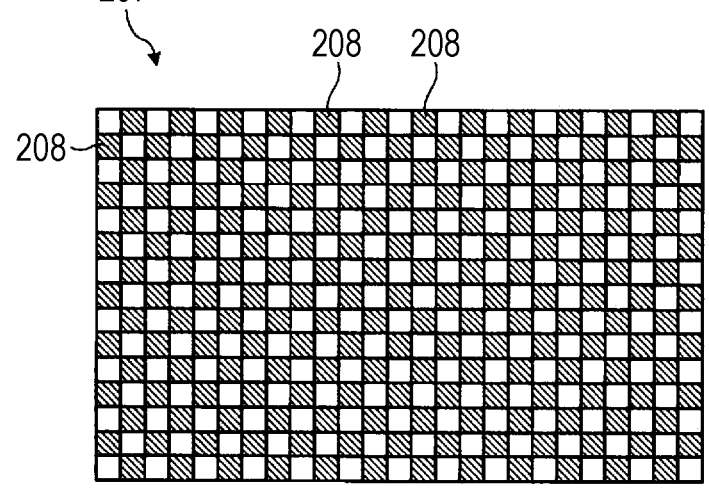
FIG. 9A is a diagram schematically illustrating an example of a sampling pattern that can be formed under the global shutter method.
Figure 9B:
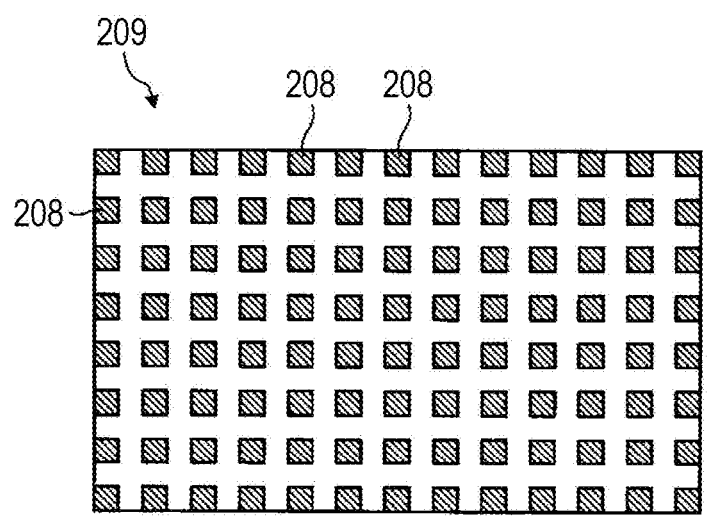
FIG. 9B is a diagram schematically illustrating an example of the sampling pattern that can be formed under the global shutter method.

FIGS. 9A and 9B are diagrams schematically illustrating an example of a sampling pattern that can be achieved under the global shutter method. FIG. 9A illustrates an example in which samples 208 from which the pixel signals are read are extracted in a checkered pattern from the pixel circuits 100 that are included in the frame 200 and are arranged in a matrix. Furthermore, FIG. 9B illustrates an example in which the samples 208 from which pixel signals are read are extracted in a grid pattern from the pixel circuits 100. Furthermore, it is also possible to perform, even under the global shutter method, imaging on a line-by-line basis in a similar manner to the rolling shutter method described above.

(2-3. DNN)

Next, recognition processing using a deep neural network (DNN) applicable to each embodiment will be schematically described. In each embodiment, recognition processing on image data is performed using a convolutional neural network (CNN) and a recurrent neural network (RNN) as the DNN. Hereinafter, the "recognition processing on image data" is referred to as, for example, "image recognition processing" as needed.

(2-3-1. Overview of CNN)

Figure 10:
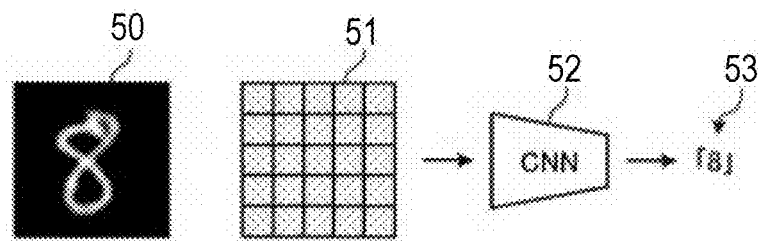
FIG. 10 is a diagram schematically illustrating image recognition processing using a CNN.

First, the CNN will be schematically described. In general, image recognition processing using the CNN is performed on the basis of image information based on pixels arranged in a matrix, for example. FIG. 10 is a diagram schematically illustrating the image recognition processing using the CNN. Processing using a CNN 52 that has been learned in a predetermined manner is performed on pixel information 51 of an image 50 showing a written digit "8" that is an object to be recognized. As a result, the digit "8" is recognized as a recognition result 53.

Figure 11:
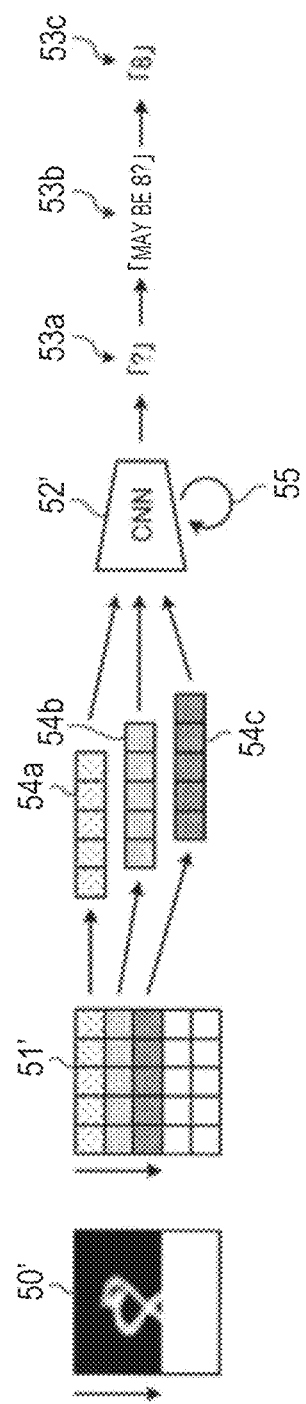
FIG. 11 is a diagram schematically illustrating image recognition processing for obtaining a recognition result from a part of a recognition target image.

On the other hand, it is also possible to obtain a recognition result from a part of the recognition target image by performing processing using the CNN on the basis of each line image. FIG. 11 is a diagram schematically illustrating image recognition processing for obtaining a recognition result from a part of the recognition target image. In FIG. 11, the image 50' is obtained by acquiring partially, that is, on a line-by-line basis, the digit "8" that is a recognition target object. For example, pixel information 54a, 54b, and 54c for each line constituting pixel information 51' of the image 50' is sequentially processed using the CNN 52' learned in a predetermined manner.

For example, it is assumed that a recognition result 53a of the recognition processing using the CNN 52' performed on the pixel information 54a of the first line is not a valid recognition result. Here, the valid recognition result refers to, for example, a recognition result showing that a score indicating a reliability degree of the recognition result is greater than or equal to a predetermined value.

Note that the reliability degree according to the present embodiment means an evaluation value indicating how trustworthy the recognition result [T] output by the DNN is. For example, a range of the reliability degree is from 0.0 to 1.0, and the closer the numerical value is to 1.0, the less the number of similar candidates close in score to the recognition result [T]. On the other hand, the closer the numerical value is to 0, the more the number of similar candidates close in score to the recognition result [T].

The CNN 52' performs updating 55 of an internal state on the basis of the recognition result 53a. Next, recognition processing is performed on the pixel information 54b of the second line using the CNN 52' whose internal state has been subjected to the updating 55 in accordance with the last recognition result 53a. In FIG. 11, as a result, a recognition result 53b indicating that the recognition target digit is either "8" or "9" is obtained. The updating 55 of internal information of the CNN 52' is further performed on the basis of the recognition result 53b. Next, recognition processing is performed on the pixel information 54c of the third line using the CNN 52' whose internal state has been subjected to the updating 55 in accordance with the last recognition result 53b. In FIG. 11, as a result, the recognition target digit is narrowed down to "8" out of "8" and "9".

Here, in the recognition processing illustrated in FIG. 11, the internal state of the CNN is updated using the result of the last recognition processing, and the recognition processing is performed using the pixel information of the line adjacent to the line subjected to the last recognition processing using the CNN whose internal state has been updated. That is, the recognition processing illustrated in FIG. 11 is performed on the image on a line-by-line basis while updating the internal state of the CNN on the basis of the last recognition result. Therefore, the recognition processing illustrated in FIG. 11 is processing recursively performed on a line-by-line basis, and can be considered to have a structure corresponding to the RNN.

(2-3-2. Overview of RNN)

Figure 12A:
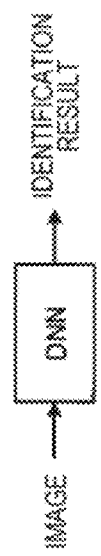
FIG. 12A is a diagram schematically illustrating an example of identification processing using a DNN in a case where time-series information is not used.
Figure 12B:
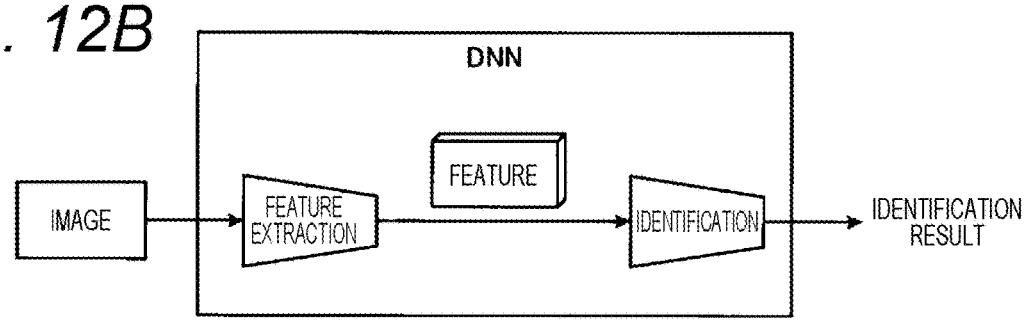
FIG. 12B is a diagram schematically illustrating an example of the identification processing using a DNN in a case where time-series information is not used.

Next, the RNN will be schematically described. FIGS. 12A and 12B are diagrams schematically illustrating an example of identification processing (recognition processing) performed using the DNN in a case where time-series information is not used. In this case, as illustrated in FIG. 12A, one image is input to the DNN. In the DNN, identification processing is performed on the input image, and an identification result is output.

FIG. 12B is a diagram for describing the processing illustrated in FIG. 12A in more detail. As illustrated in FIG. 12B, the DNN performs feature extraction processing and identification processing. The DNN performs the feature extraction processing to extract a feature from the input image. Furthermore, the DNN performs the identification processing on the extracted feature to obtain an identification result.

Figure 13A:
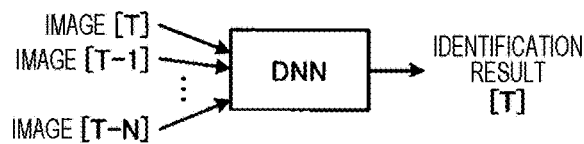
FIG. 13A is a diagram schematically illustrating a first example of the identification processing using a DNN in a case where time-series information is used.
Figure 13B:
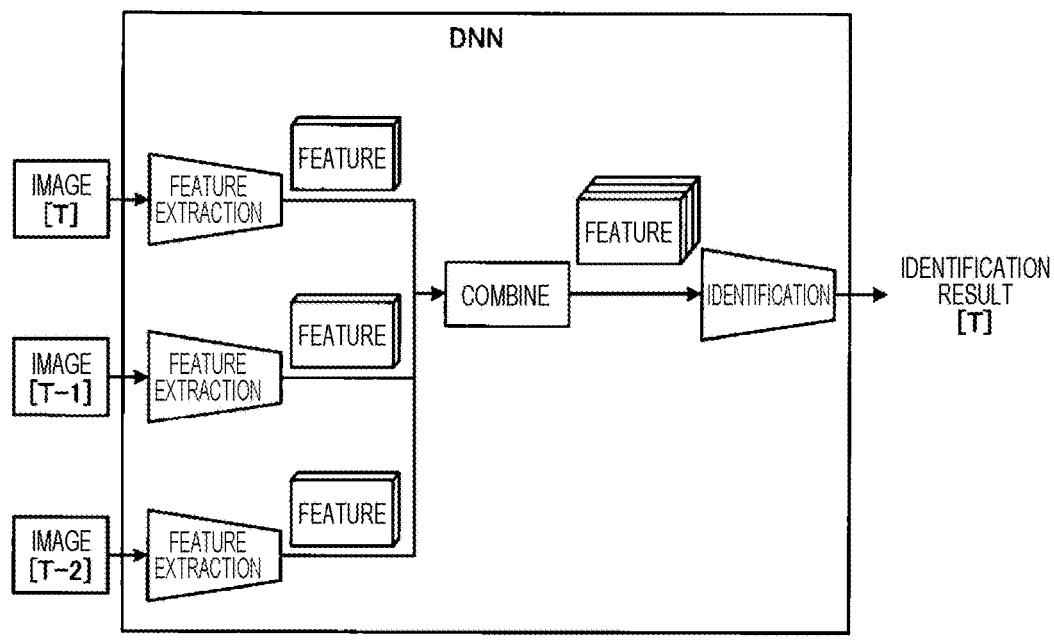
FIG. 13B is a diagram schematically illustrating the first example of the identification processing using a DNN in a case where time-series information is used.

FIGS. 13A and 13B are diagrams schematically illustrating a first example of the identification processing using the DNN in a case where time-series information is used. In the example illustrated in FIGS. 13A and 13B, a fixed number of pieces of past time-series information is subjected to the identification processing using the DNN. In the example illustrated in FIG. 13A, an image [T] at a time T, an image [T-1] at a time T-1 before the time T, and an image [T-2] at a time T-2 before the time T-1 are input to the DNN. In the DNN, the identification processing is performed on each of the input images [T], [T-1], and [T-2] to obtain an identification result [T] at a time T. A reliability degree is given to the identification result [T].

FIG. 13B is a diagram for describing the processing illustrated in FIG. 13A in more detail. As illustrated in FIG. 13B, in the DNN, the feature extraction processing described above with reference to FIG. 12B is performed, on a one-to-one basis, on each of the input images [T], [T-1], and [T-2] to extract features corresponding to the images [T], [T-1], and [T-2]. In the DNN, the respective features obtained on the basis of the images [T], [T-1], and [T-2] are combined, and the identification processing is performed on the combined feature to obtain the identification result [T] at the time T. A reliability degree is given to the identification result [T].

Under the method illustrated in FIGS. 13A and 13B, a plurality of components for performing feature extraction is required, and a component for performing feature extraction in accordance with the number of available past images is required, so that there is a possibility that the configuration of the DNN becomes large.

Figure 14A:
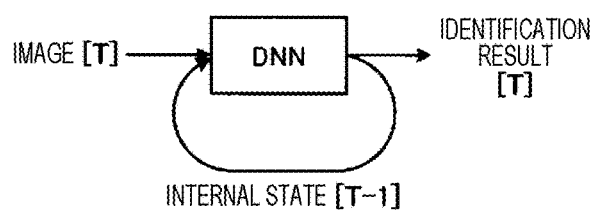
FIG. 14A is a diagram schematically illustrating a second example of the identification processing using a DNN in a case where time-series information is used.
Figure 14B:
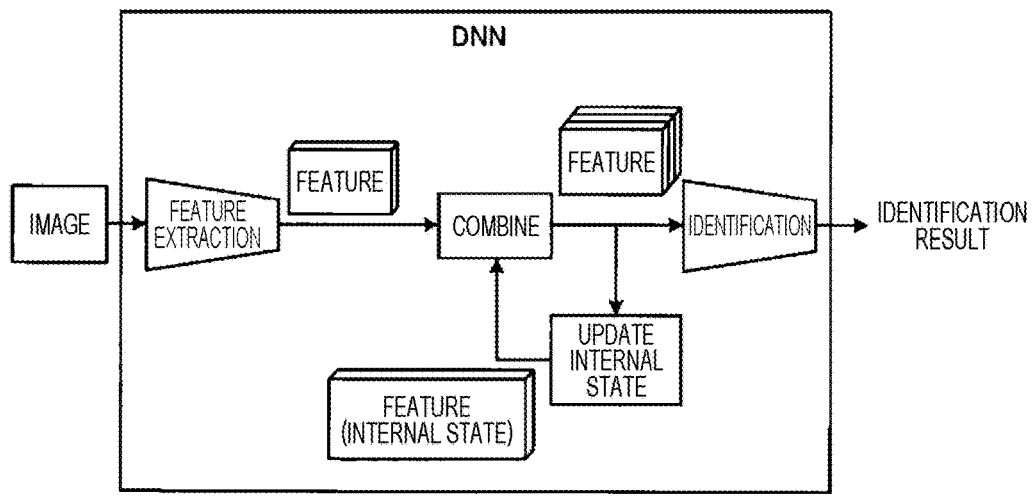
FIG. 14B is a diagram schematically illustrating the second example of the identification processing using a DNN in a case where time-series information is used.

FIGS. 14A and 14B are diagrams schematically illustrating a second example of the identification processing using the DNN in a case where time-series information is used. In the example illustrated in FIG. 14A, an image [T] at a time T is input to the DNN whose internal state has been updated to a state at a time T-1, and an identification result [T] at the time T is obtained. A reliability degree is given to the identification result [T].

FIG. 14B is a diagram for describing the processing illustrated in FIG. 14A in more detail. As illustrated in FIG. 14B, in the DNN, the feature extraction processing described above with reference to FIG. 12B is performed on the input image [T] at the time T, and a feature corresponding to the image [T] is extracted. In the DNN, the internal state is updated using an image before the time T, and the feature related to the updated internal state is stored. The stored feature related to the internal information and the feature of the image [T] are combined, and the identification processing is performed on the combined feature.

The identification processing illustrated in FIGS. 14A and 14B is performed using, for example, the DNN whose internal state has been updated using the last identification result, and is thus recursive processing. Such a DNN that performs recursive processing is referred to as a recurrent neural network (RNN). The identification processing using the RNN is generally used for moving image recognition or the like, and, for example, the internal state of the DNN is sequentially updated by frame images updated in time series, thereby allowing an increase in identification accuracy.

In the present disclosure, the RNN is applied to a structure using the rolling shutter method. That is, under the rolling shutter method, reading of pixel signals is performed on a line-by-line basis. Therefore, the pixel signals read on a line-by-line basis is applied to the RNN as time-series information. As a result, the identification processing based on the plurality of lines can be performed with a small-scale configuration as compared with a configuration using the CNN (see FIG. 13B). Alternatively, the RNN may be applied to a structure using the global shutter method. In this case, for example, it is conceivable that adjacent lines are regarded as time-series information.

(2-4. Driving Speed)

Figure 15A:
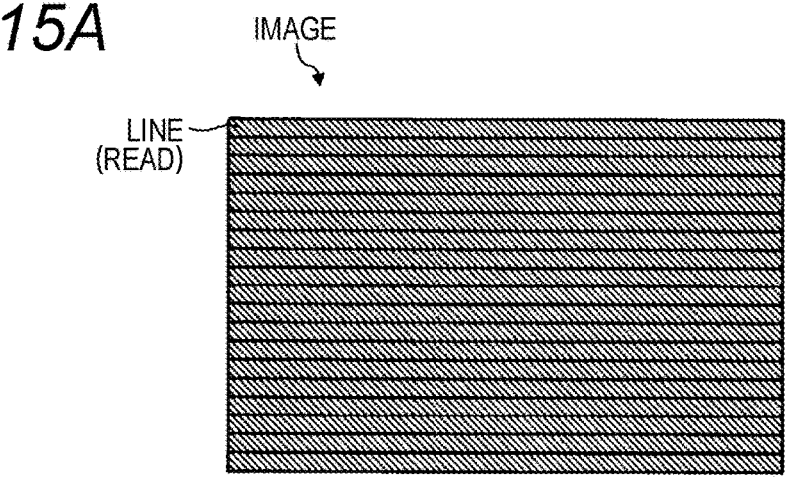
FIG. 15A is a diagram for describing a relation between a driving speed of a frame and a reading amount of a pixel signal.
Figure 15B:
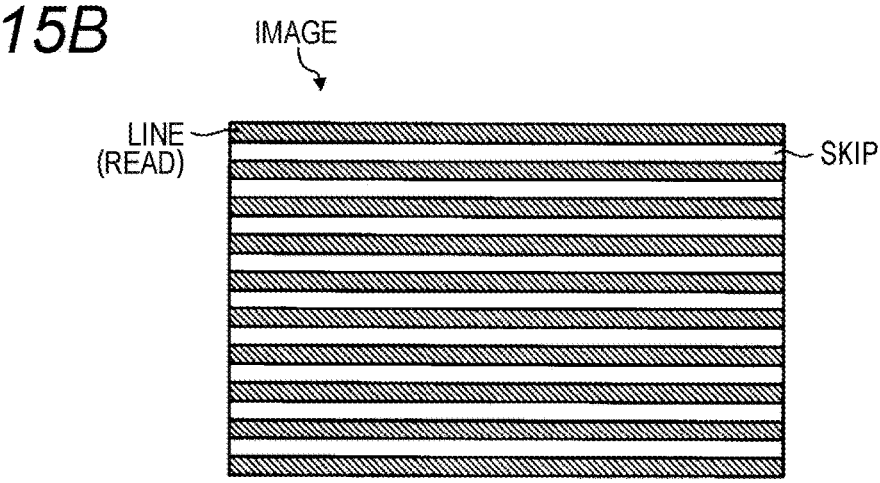
FIG. 15B is a diagram for describing a relation between a driving speed of a frame and a reading amount of a pixel signal.

Next, a relation between a driving speed of the frame and a reading amount of the pixel signal will be described with reference to FIGS. 15A and 15B. FIG. 15A is a diagram illustrating an example in which all lines in an image are read. Here, it is assumed that the resolution of an image to be subjected to recognition processing is 640 pixels in the horizontal direction*480 pixels (480 lines) in the vertical direction. In this case, driving at a driving speed of 14400 [line/second] allows output at 30 [frame per second (fps)].

Next, consider a case where imaging is performed with line skipping. For example, as illustrated in FIG. 15B, it is assumed that imaging is performed while skipping every other line, that is, imaging is performed with ½ skipping. As a first example of the ½ skipping, in a case of driving at a driving speed of 14400 [lines/second] in the same manner as described above, the number of lines to be read from the image becomes ½, so that the resolution decreases, but it is possible to output at 60 [fps] that is twice the speed in a case where no skipping is performed, allowing an increase in the frame rate. As a second example of the ½ skipping, in a case of driving at a driving speed of 7200 [fps] that is a half of the driving speed in the first example, the frame rate is 30 [fps] as in a case where no skipping is performed, but power consumption can be reduced.

When the line image is read, whether no skipping is performed, skipping is performed to increase the driving speed, or the driving speed in a case where skipping is performed is set equal to the driving speed in a case where no skipping is performed can be selected in accordance with, for example, the purpose of the recognition processing based on the read pixel signal.

Figure 16:
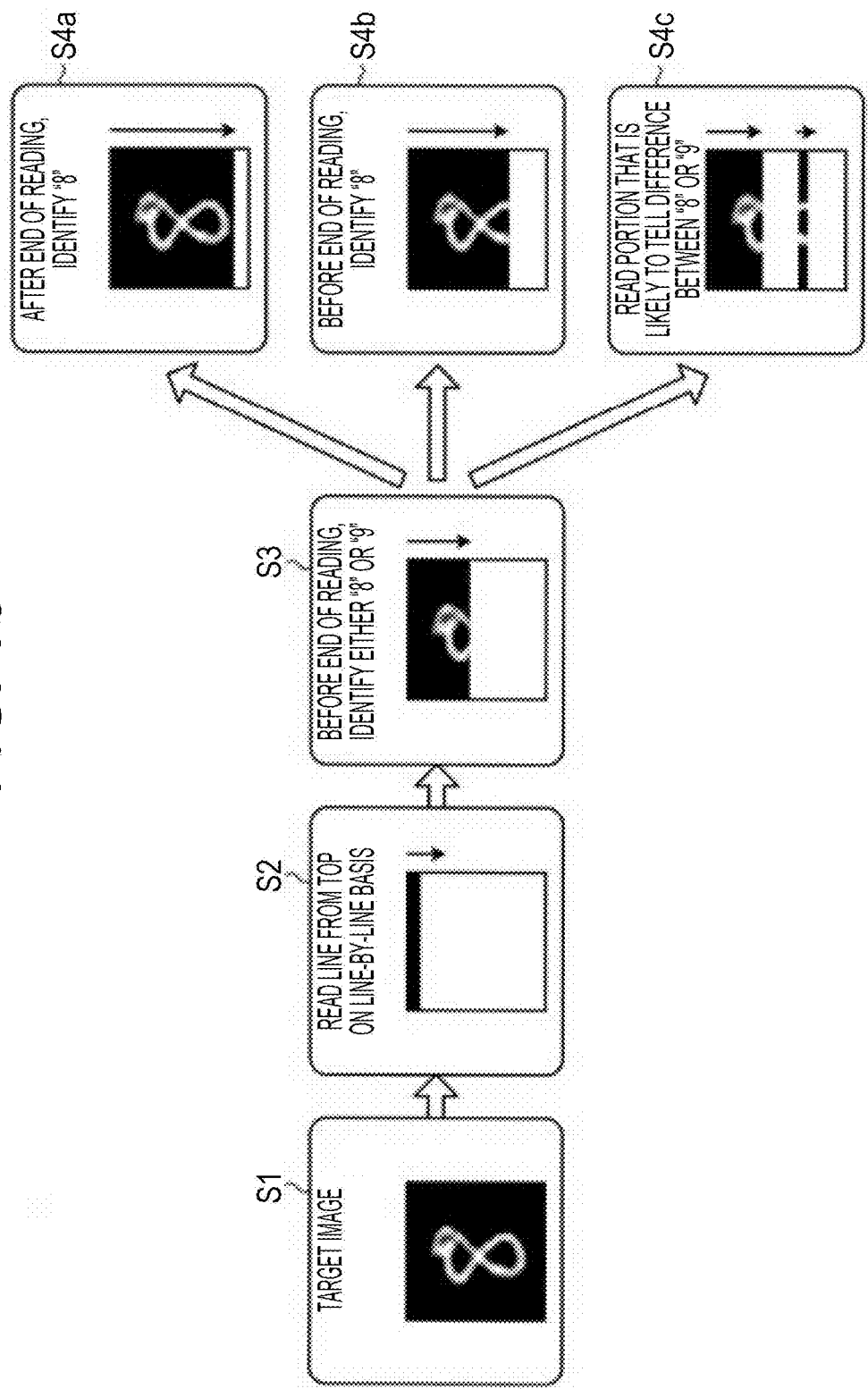
FIG. 16 is a schematic diagram for schematically describing a recognition processing according to each embodiment of the present disclosure.

FIG. 16 is a schematic diagram for schematically describing recognition processing according to the present embodiment of the present disclosure. In FIG. 16, in step S1, the information processing system 1 (see FIG. 1) according to the present embodiment starts to capture a recognition target image.

Note that the target image is, for example, an image showing a handwritten digit "8". Furthermore, it is assumed that a learning model learned using predetermined training data to be able to identify a digit is prestored in the memory 13 as a program, and the recognition processing unit 12 can identify a digit included in an image by executing the program loaded from the memory 13. Moreover, it is assumed that the information processing system 1 performs imaging using the rolling shutter method. Note that, even in a case where the information processing system 1 performs imaging using the global shutter method, the following processing is applicable in a similar manner to a case where the rolling shutter method is used.

When the imaging is started, the information processing system 1 sequentially reads, on a line-by-line basis, a frame from the upper end to the lower end of the frame in step S2.

When the line reading reaches a certain position, the recognition processing unit 12 recognizes digits "8" and "9" from the image of the read lines (step S3). For example, since the digits "8" and "9" whose upper half portions have a common feature portion, when the feature portion is recognized after sequentially reading lines from the top, the recognized object can be identified as either the digit "8" or "9".

Here, as illustrated in step S4a, the whole of the object recognized after the end of reading up to the lower end line or a line near the lower end of the frame appears, and the object identified as either the digit "8" or "9" in step S2 is determined to be the digit "8".

On the other hand, steps S4b and S4c are processes related to the present disclosure.

As illustrated in step S4b, the line reading further proceeds from the line position read in step S3, and the recognized object can be identified as the digit "8" even before the line position reaches the lower end of the digit "8". For example, the lower half of the digit "8" and the lower half of the digit "9" are different in feature from each other. When the line reading proceeds up to a portion where the difference in feature becomes clear, it is possible to identify the object recognized in step S3 as either of the digits "8" and "9". In the example illustrated in FIG. 16, the object is determined in step S4b to be the digit "8".

Furthermore, as illustrated in step S4c, it is also conceivable that when the line reading further proceeds from the line position in step S3, that is, from the state of step S3, the line reading may jump to a line position at which it is likely that the object recognized in step S3 is identified as either of the digits "8" and "9". When the line reading is performed on the line after the jump, it is possible to determine whether the object recognized in step S3 is either "8" or "9". Note that the line position after the jump can be determined on the basis of a learning model learned in advance on the basis of predetermined training data.

Here, in a case where the object is determined in step S4b or step S4c described above, the information processing system 1 can terminate the recognition processing. It is therefore possible to shorten the recognition processing and reduce power consumption in the information processing system 1.

Note that the training data is data containing a plurality of combinations of input signals and output signals for each read unit. As an example, in the task of identifying a digit described above, data (line data, subsampled data, or the like) for each read unit can be used as the input signal, and data indicating a "correct digit" can be used as the output signal. As another example, in a task of detecting an object, for example, data (line data, subsampled data, or the like) for each read unit can be used as the input signal, and an object class (human body/vehicle/non-object), object coordinates (x, y, h, w), or the like can be used as the output signal. Alternatively, the output signal may be generated only from the input signal using self-supervised learning.

First Embodiment

Figure 17:
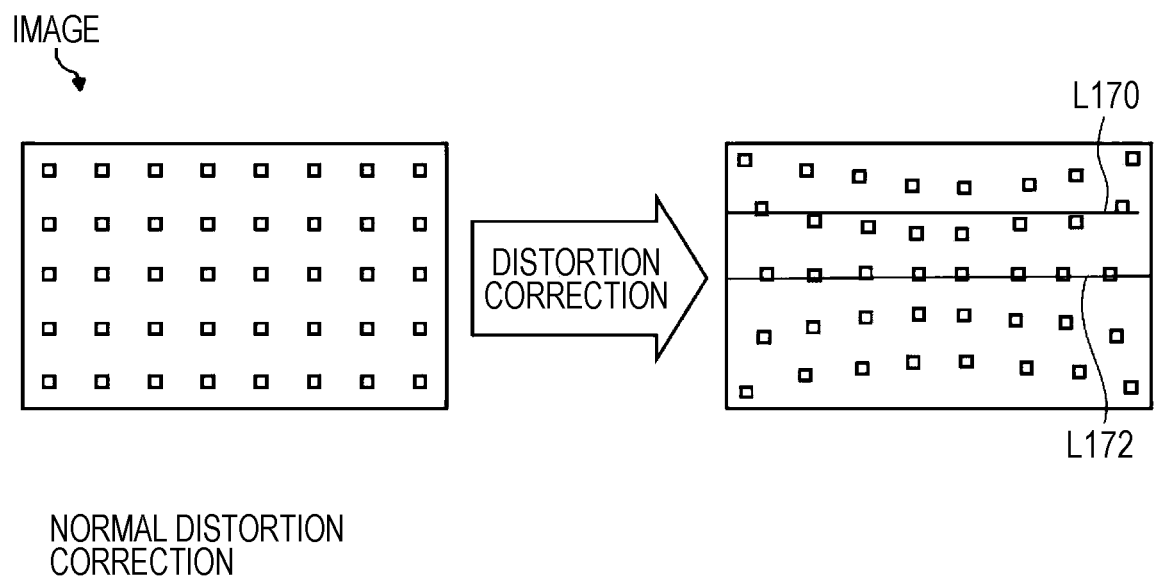
FIG. 17 is a diagram illustrating a problem in recognition processing in a case of outputting a pixel signal.

FIG. 17 is a diagram illustrating a problem in recognition processing in a case of outputting a pixel signal corresponding to light incident on the light receiving surface via the optical unit 30.

As illustrated in FIG. 17, image data obtained by correcting distortion of image data in the left diagram in accordance with lens parameters of the optical unit 30 is illustrated in the right diagram. In a case where line data L170, L172 as illustrated in FIG. 16 is read from the data after the distortion correction in the right diagram, the distortion becomes stronger and the density of the pixels on the line data L170 decreases in an image peripheral portion as in the line data L170. On the other hand, in the pixel central region, the distortion is less than that in the peripheral portion, and the pixel density of the pixels on the line data L172 is greater than the density of the pixels on the line data L170. As described above, when the density is different between the line data L170, L172, the recognition rate of the recognition processing of the recognition processing execution unit 124 decreases. On the other hand, even if non-uniform sampling is performed so as to extract active pixels, the active pixels do not become square, and it becomes difficult for the recognition processing execution unit 124 to execute the recognition processing.

Figure 18:
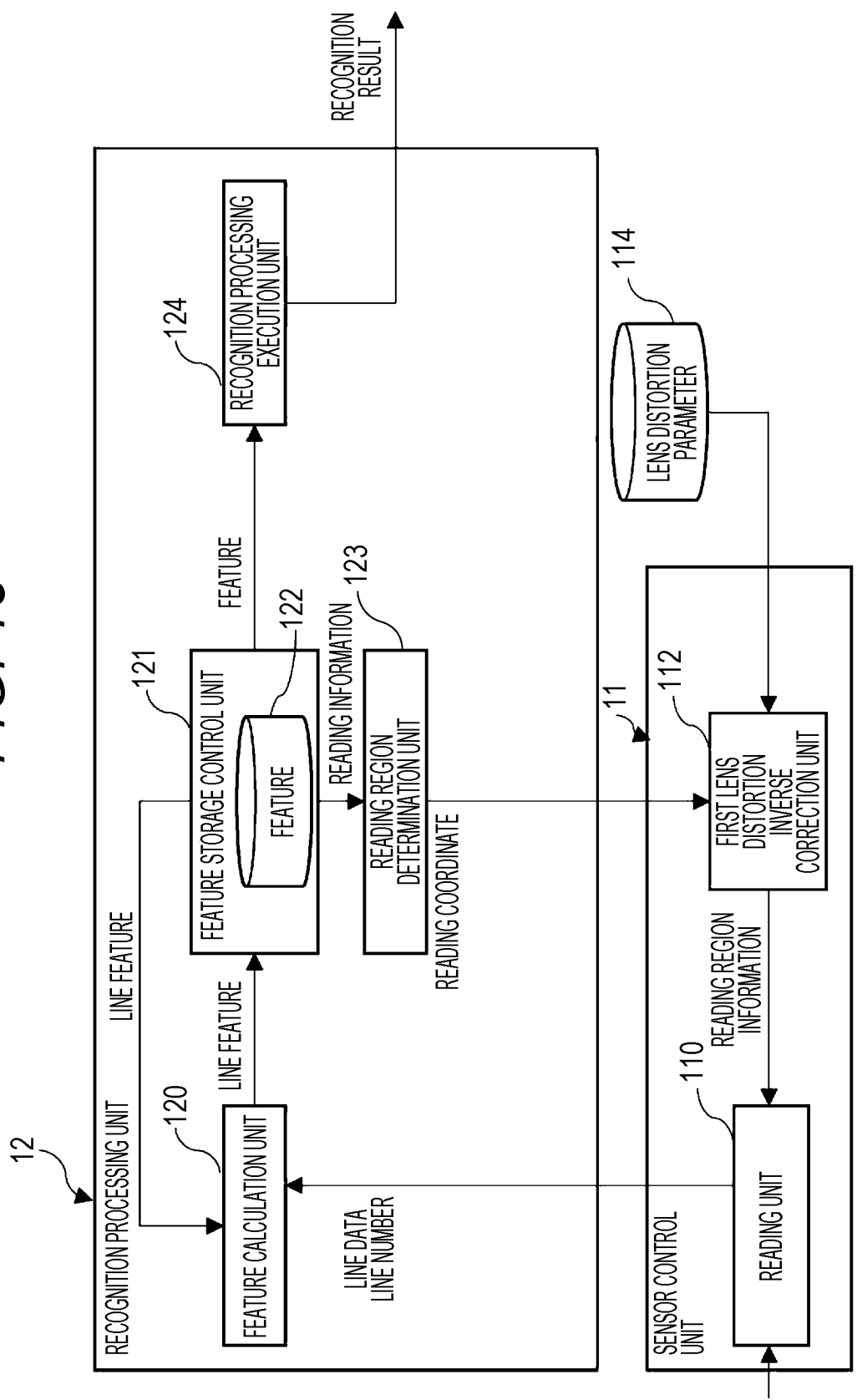
FIG. 18 is a functional block diagram of an example for describing a function of a sensor control unit and a function of a recognition processing unit.

FIG. 18 is a functional block diagram of an example for describing the function of the sensor control unit 11 and the function of the recognition processing unit 12 according to the present embodiment.

In FIG. 18, the sensor control unit 11 includes a reading unit 110 and a first lens distortion inverse correction unit 112. FIG. 18 further illustrates a storage unit 114 that stores information regarding a lens distortion parameter.

The recognition processing unit 12 includes a feature calculation unit 120, a feature storage control unit 121, a reading region determination unit 123, and a recognition processing execution unit 124.

In the sensor control unit 11, the reading unit 110 sets pixels to be read in the pixel array unit 101 (see FIG. 4) in which a plurality of pixels is arranged in a two-dimensional array on the basis of coordinates indicated by the first lens distortion inverse correction unit 112.

The first lens distortion inverse correction unit 112 performs coordinate conversion on the basis of the information regarding the lens distortion parameter stored in the storage unit 114, and supplies a result of the coordinate conversion to the reading unit 110. The first lens distortion inverse correction unit 112 receives reading region information indicating a read region to be read by the recognition processing unit 12 from the reading region determination unit 123. The reading region information is, for example, a line number of one or a plurality of lines. Alternatively, the reading region information may be information indicating a pixel position in one line. Furthermore, combining one or more line numbers and information indicating the pixel position of one or more pixels in a line as the reading region information makes it possible to designate reading regions of various patterns. Note that the reading region is equivalent to the read unit. Alternatively, the reading region and the read unit may be different from each other.

Furthermore, the reading unit 110 can receive information indicating exposure and analog gain from the recognition processing unit 1 or the visual field processing unit 14 (see FIG. 1). The reading unit 110 reads the pixel data from the sensor unit 10 in accordance with the reading region information input from the first lens distortion inverse correction unit 112. For example, the reading unit 110 obtains a line number indicating a line to be read and pixel position information indicating a position of a pixel to be read in the line on the basis of the reading region information, and outputs the obtained line number and pixel position information to the sensor unit 10.

Furthermore, the reading unit 110 sets exposure and an analog gain (AG) for the sensor unit 10 in accordance with the supplied information indicating the exposure and the analog gain. Moreover, the reading unit 110 can generate a vertical synchronization signal and a horizontal synchronization signal and supply the signals to the sensor unit 10.

In the recognition processing unit 12, the reading region determination unit 123 receives reading information indicating a reading region to be read next from the feature storage control unit 121. The reading region determination unit 123 generates reading region information on the basis of the received reading information, and outputs the reading region information to the reading unit 110.

Here, the reading region determination unit 123 can use, as the reading region indicated by the reading region information, for example, information in which reading position information for reading pixel data of a predetermined read unit is added to the predetermined read unit. The read unit is a set of one or more pixels, and is a unit of processing by the recognition processing unit 12 and the visual recognition processing unit 14. As an example, when the read unit is a line, a line number [L #x] indicating a line position is added as the reading position information. Furthermore, in a case where the read unit is a rectangular area including a plurality of pixels, information indicating the position of the rectangular region in the pixel array unit 101, for example, information indicating the position of a pixel in the upper left corner is added as the reading position information. In the reading region determination unit 123, the read unit to be applied is specified in advance. Furthermore, in a case where a subpixel is read under the global shutter method, the reading region determination unit 123 can include position information of the subpixel in the reading region. Alternatively, the reading region determination unit 123 may determine the read unit in accordance with, for example, an instruction from the outside of the reading region determination unit 123. Therefore, the reading region determination unit 123 functions as a read unit control unit that controls the read unit.

Note that the reading region determination unit 123 can also determine a reading region to be read next on the basis of recognition information supplied from the recognition processing execution unit 124 to be described later, and generate reading region information indicating the determined reading region.

In the recognition processing unit 12, the feature calculation unit 120 calculates, on the basis of the pixel data and the reading region information supplied from the reading unit 110, the feature of the region indicated by the reading region information. The feature calculation unit 120 outputs the calculated feature to the feature storage control unit 121.

The feature calculation unit 120 may calculate the feature on the basis of the pixel data supplied from the reading unit 110 and a past feature supplied from the feature storage control unit 121. Alternatively, the feature calculation unit 120 may acquire information for setting the exposure and the analog gain from the reading unit 110, for example, and further use the acquired information to calculate the feature.

In the recognition processing unit 12, the feature storage control unit 121 stores the feature supplied from the feature calculation unit 120 in a feature storage unit 122. Furthermore, when the feature is supplied from the feature calculation unit 120, the feature storage control unit 121 generates reading information indicating a reading region to be read next and outputs the reading information to the reading region determination unit 123.

Here, the feature storage control unit 121 can combine the already stored feature and the newly supplied feature and store the combined feature. Furthermore, the feature storage control unit 121 can delete an unnecessary feature among the features stored in the feature storage unit 122. The unnecessary feature may be, for example, a feature related to the previous frame, a feature calculated on the basis of a frame image of a scene different from a frame image for which a new feature has been calculated and already stored, or the like. Furthermore, the feature storage control unit 121 can also delete and initialize all the features stored in the feature storage unit 122 as necessary.

Furthermore, the feature storage control unit 121 generates a feature used for recognition processing by the recognition processing execution unit 124 on the basis of the feature supplied from the feature calculation unit 120 and the feature stored in the feature storage unit 122. The feature storage control unit 121 outputs the generated feature to the recognition processing execution unit 124.

The recognition processing execution unit 124 performs recognition processing on the basis of the feature supplied from the feature storage control unit 121. The recognition processing execution unit 124 performs object detection, face detection, or the like during recognition processing. The recognition processing execution unit 124 outputs a recognition result of the recognition processing to the output control unit 15. The recognition result includes information indicating a detection score.

The recognition processing execution unit 124 can also output recognition information including the recognition result generated by the recognition processing to the reading region determination unit 123. Note that the recognition processing execution unit 124 can receive the feature from the feature storage control unit 121 and perform recognition processing on the basis of, for example, a trigger generated by a trigger generation unit (not illustrated).

Figure 19:
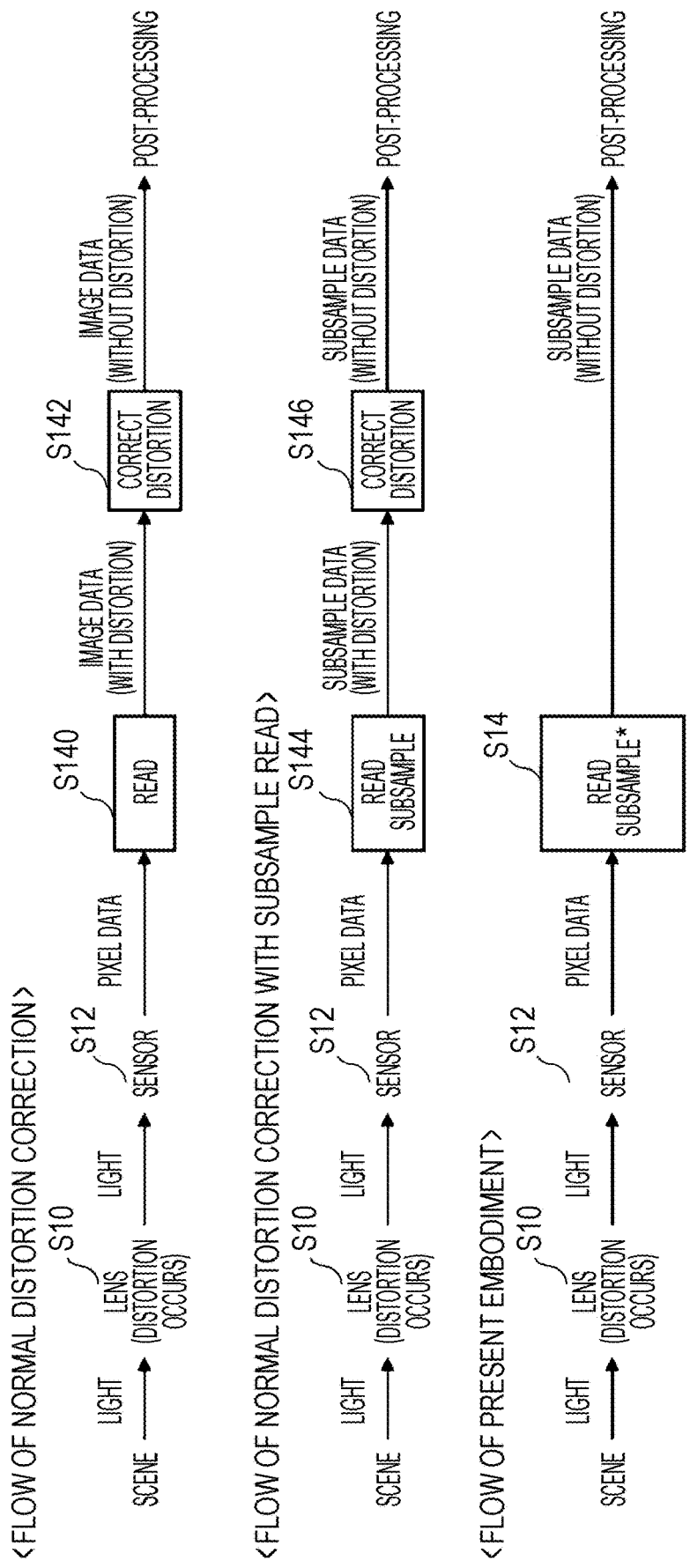
FIG. 19 is a diagram illustrating a processing flow according to the present embodiment.

FIG. 19 is a diagram illustrating a processing flow according to the present embodiment. The upper diagram illustrates a flow of normal distortion correction, the middle diagram illustrates a flow of normal distortion correction in a case of subsample reading, and the lower diagram illustrates a processing flow according to the present embodiment. As illustrated in the lower diagram, in the processing flow according to the present embodiment, a scene is transmitted through the lens of the optical unit 30 (S10). At this time, a position where the scene is concentrated on the sensor unit 10 by the lens suffers distortion in a manner that depends on the position of the scene.

Next, the scene formed as an image is converted into pixel data by the sensor unit 10 (S12). The reading unit 110 reads image data under consideration of lens distortion such that the scene is uniformly sampled after distortion correction (S12), and supplies the image data to the feature calculation unit 120 (S14).

On the other hand, in the normal processing, the image data is read (S140), and distortion correction is performed after the reading (S142). The image data processed in this manner corresponds to the upper right diagram in FIG. 17. Furthermore, in the flow of performing normal distortion correction in a case of sample read, the image data is subjected to sample read (S144), and distortion correction is performed after the reading (S146). Also in this case, as in the right diagram of FIG. 17, the image data becomes non-uniform.

Here, a processing example of the first lens distortion inverse correction unit 112 will be described in detail with reference to FIGS. 20 to 24.

Figure 20:
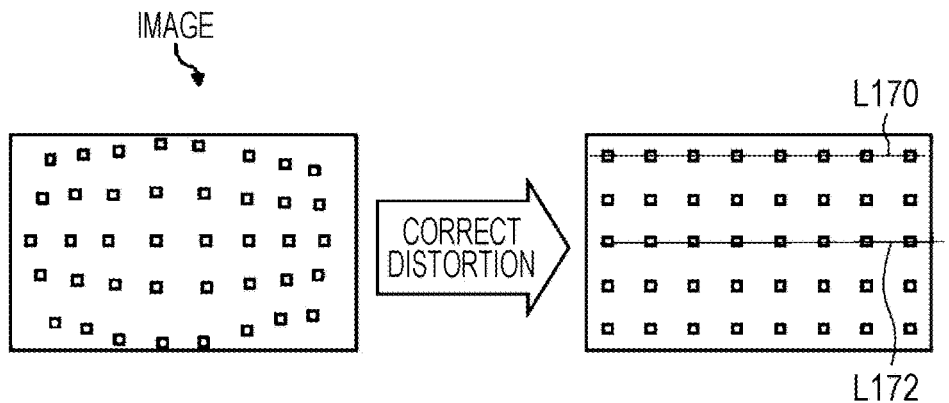
FIG. 20 is a diagram for describing a processing example of a first lens distortion inverse correction unit.

FIG. 20 is a diagram schematically illustrating a processing example of the first lens distortion inverse correction unit 112. Here, (x, y) coordinates are coordinates for which a read instruction has been received from the reading region determination unit 123. Furthermore, (x1, y1) are coordinates of coordinate image data corresponding to (x, y). As described above, the storage unit 114 stores the distortion parameter indicating a correspondence between the coordinates (x1, y1) and the coordinates (x, y). Here, when the distortion parameter indicating this correspondence is expressed by a function f, f(x1, y1)=(x, y) is obtained.

Therefore, the first lens distortion inverse correction unit 112 inversely transform the coordinates (x, y) of the image region indicated by the reading region determination unit 123 into coordinates (x1, y1). Here, this inverse transformation is expressed by $f^{-1}(x, y)$. The reading unit 110 reads image data corresponding to the inversely transformed coordinates (x1, y1) from the sensor unit 10, and supplies the image data as image data of the coordinates (x, y) to the feature calculation unit 120. As a result, the feature calculation unit 120 can calculate a feature from the line data L170, L172. In this case, as illustrated in FIG. 20, the image data on the line data L170, L172 is approximately uniform, so that the recognition rate in the recognition processing execution unit 124 is made uniform without being affected by variations depending on the positions of the line data L170, L172.

Figure 21:
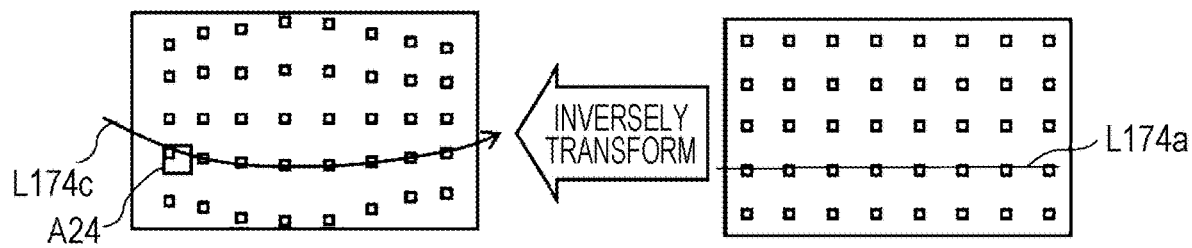
FIG. 21 is a diagram schematically illustrating a processing example of the first lens distortion inverse correction unit in a case of reading data corresponding to one-line data.

FIG. 21 is a diagram schematically illustrating a processing example of the first lens distortion inverse correction unit 112 in a case of reading data corresponding to one-line data. Here, (x, y) coordinates on a line L174a are coordinates for which a read instruction has been received from the reading region determination unit 123. Furthermore, (x1, y1) are coordinates of coordinate image data corresponding to (x, y). The (x, y) coordinate on the line L174a is inversely transformed as $f^{-1}(x, y)$. Coordinates corresponding to the (x, y) coordinates on the line L174a are (x1, y1) coordinates on a line L174c. The reading unit 110 reads image data corresponding to the inversely transformed coordinates (x1, y1) on the line L174c from the sensor unit 10, and supplies the image data as image data of the coordinates (x, y) on the line L174a to the feature calculation unit 120. An area A24 is the same as an area A24 to be described later with reference to FIG. 22.

Figure 22:
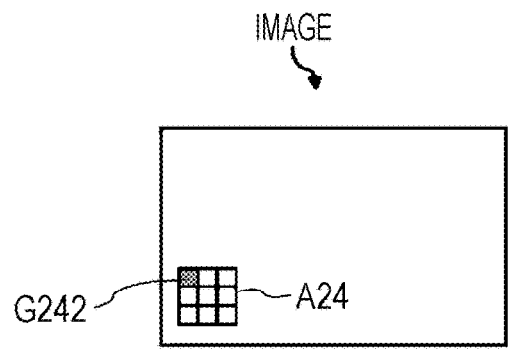
FIG. 22 is a diagram illustrating an example of substitution by reading of the binning drive.

FIG. 22 is a diagram illustrating an example in which, in a case where the coordinates (x1, y1) corresponding to the coordinates (x, y) cannot be directly read out because a circuit becomes complicated, reading by the binning drive is applied instead. In a case where a pixel G240 in FIG. 22 cannot be directly read out, for example, reading by the binning drive is applied instead to the region A24 of a 3*3 pixel range.

Figure 23A:
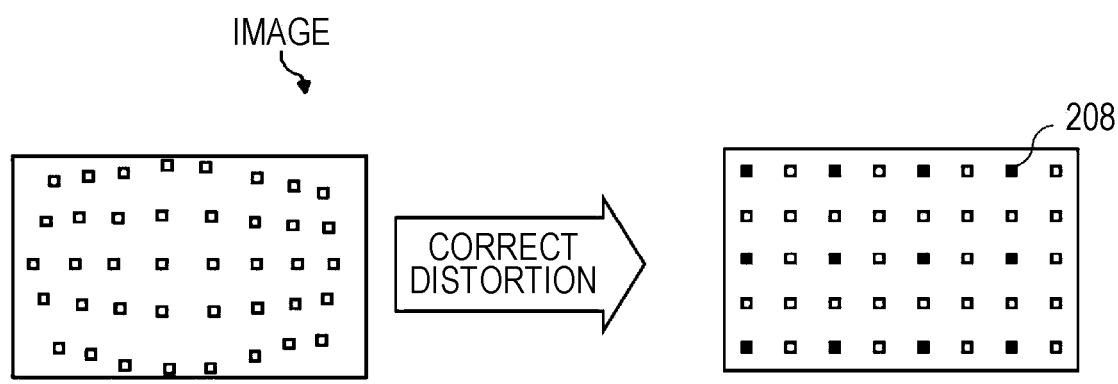
FIG. 23A is a diagram illustrating an example in which pixels are subsampled in a grid pattern as illustrated in FIG. 9B.

FIG. 23A is a diagram illustrating an example in which pixels 208 are subsampled in a grid pattern as illustrated in FIG. 9B. As illustrated in FIG. 23A, even in a case where the pixels 208 are subsampled in a grid pattern, the lens distortion of the optical unit 30 is corrected. As a result, the recognition processing by the recognition processing execution unit 124 can be performed without being affected by lens distortion of the optical unit 30.

Figure 23B:
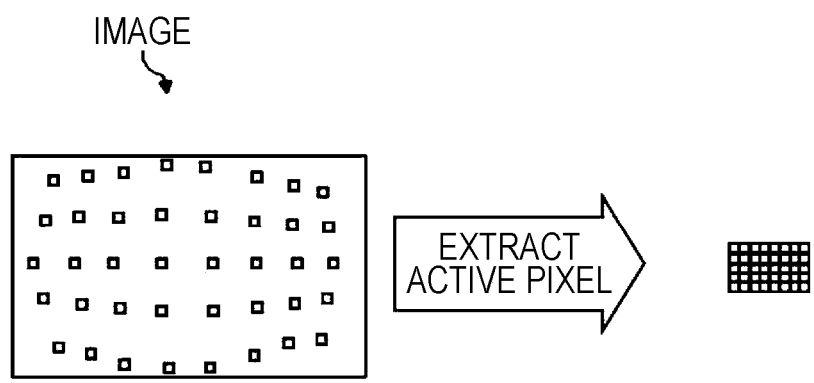
FIG. 23B is a diagram illustrating an example in which pixels are subsampled in a grid pattern.

FIG. 23B is a diagram illustrating an example in which subsampling is also performed simultaneously with coordinate transformation is performed in FIG. 23A. In this manner, the image data may be read out from the coordinates (x1, y1) obtained by inversely transforming $f^{-1}(x, y)$ and stored in the memory 13 or the like. In this case, it is also possible to perform the recognition processing without performing distortion correction and subsampling during the recognition processing.

Figure 24:
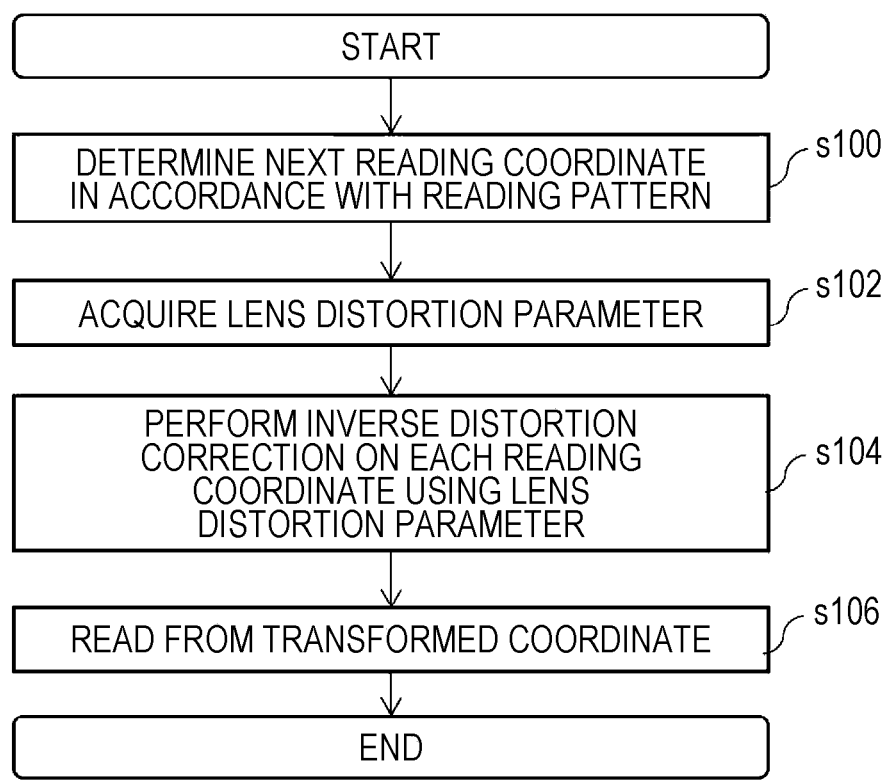
FIG. 24 is a flowchart illustrating a flow of processing of a reading unit.

FIG. 24 is a flowchart illustrating a flow of processing in the reading unit 110.

First, the reading region determination unit 123 determines the next reading region in accordance with the reading pattern (step S100), and supplies reading region information to the first lens distortion inverse correction unit 112. The reading region information includes coordinate information regarding the reading region.

Next, the first lens distortion inverse correction unit 112 acquires the lens distortion parameter from the storage unit 114 (step S102). Then, the first lens distortion inverse correction unit 112 inversely transforms the coordinates of the reading region using the lens distortion parameter (step S104). Then, the reading unit 110 reads out the image data from the sensor unit 10 (step S106), supplies the image data to the feature calculation unit 120, and brings the processing to an end.

As described above, according to the present embodiment, the first lens distortion inverse correction unit 112 inversely transforms the coordinates of the next reading region using the lens distortion parameter, reads out the image data from the sensor unit 10, and supplies the image data to the feature calculation unit 120. As a result, the lens distortion is corrected, and the feature can be calculated using the uniformized image data. Therefore, the recognition accuracy of the recognition processing by the recognition processing execution unit 124 can be further increased.

Second Embodiment

An information processing system 1 according to a second embodiment is different from the information processing system 1 according to the first embodiment in that a point-net type recognizer can be further used instead of the CNN of the recognition processing execution unit 124. Hereinafter, differences from the information processing system 1 according to the first embodiment will be described.

Figure 25:
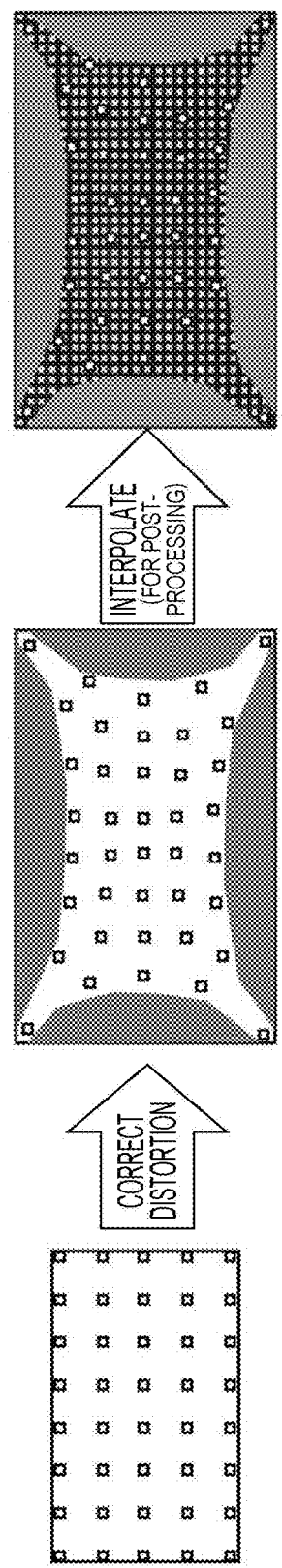
FIG. 25 is a diagram conceptually illustrating a problem in normal correction processing.

FIG. 25 is a diagram conceptually illustrating a problem in normal correction processing. The left diagram in FIG. 25 illustrates image data before correction, and the middle diagram illustrates an image after distortion correction. Then, the right diagram illustrates an image on which interpolation processing for making the distribution of pixels uniform is performed. As illustrated in the right diagram, according to the lens distortion parameter, there is a possibility that the number of pixels generated by the interpolation processing increases, and the recognition rate decreases.

Figure 26:
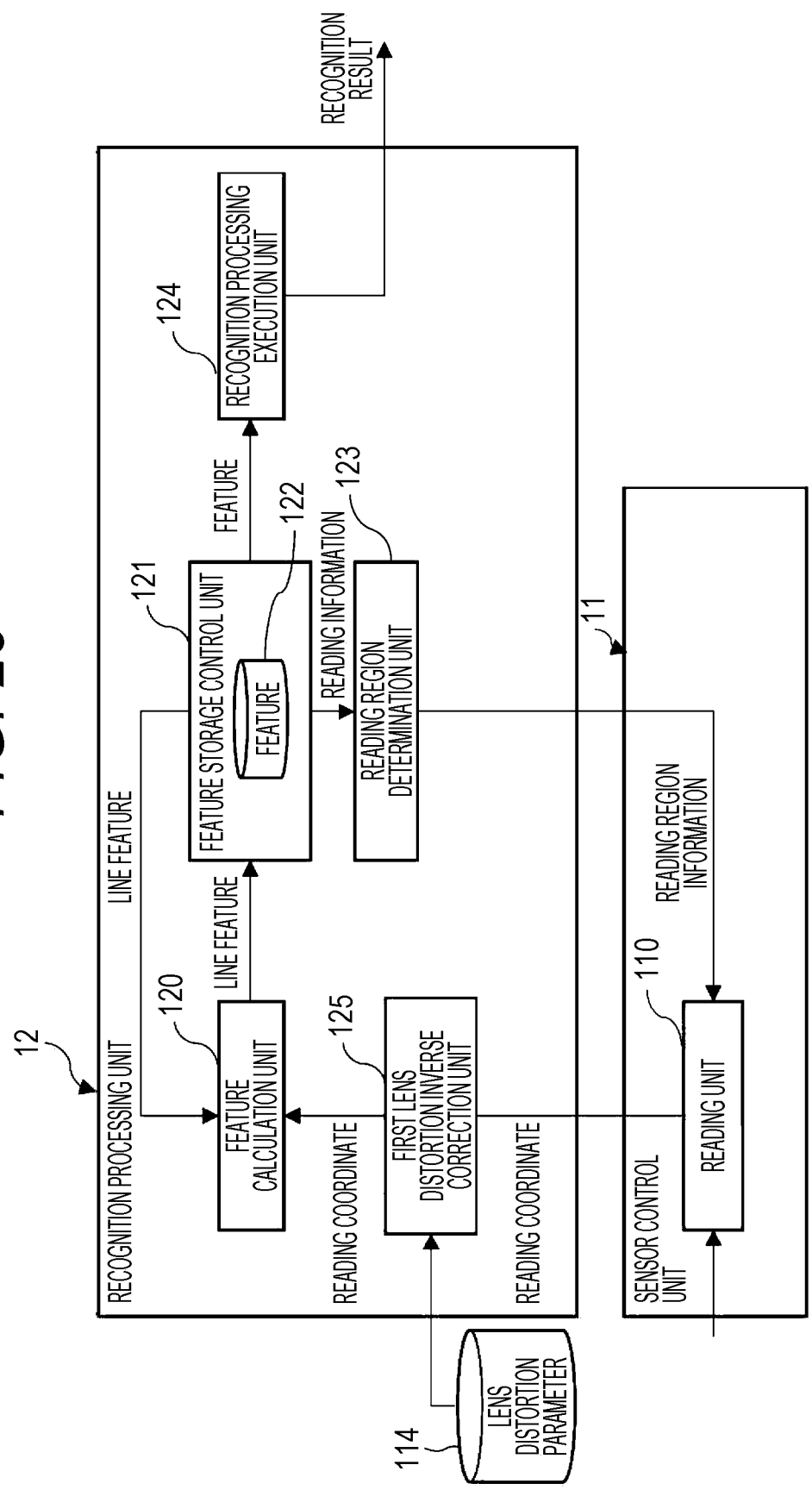
FIG. 26 is a functional block diagram of an example for describing a function of a sensor control unit and a function of a recognition processing unit according to a second embodiment.

FIG. 26 is a functional block diagram of an example for describing the function of the sensor control unit 11 and the function of the recognition processing unit 12 according to the second embodiment. As illustrated in FIG. 26, the recognition processing unit 12 according to the second embodiment further includes a second lens distortion correction unit 125.

Figure 27:
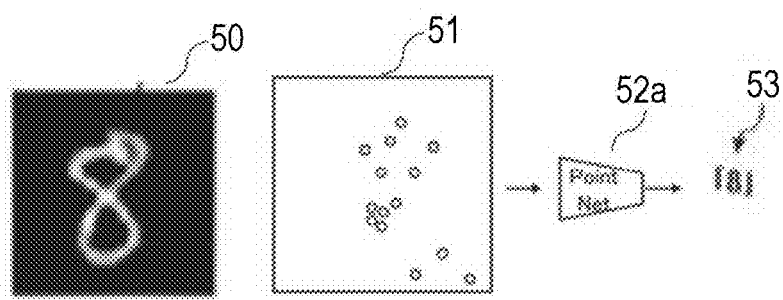
FIG. 27 is a diagram schematically illustrating a point-net type recognizer.

FIG. 27 is a diagram schematically illustrating a point-net type recognizer 52a. The point-net type recognizer 52a has the recognition rate maintained even for data in which the image data is not arranged in a grid pattern, and the distribution of the image data is uneven. Therefore, as illustrated in the middle diagram in FIG. 25, pixel values of a point group can also be recognized. Note that images 50, 51 are images equivalent to the images 50, 51 in FIG. 10 described above.

Figure 28:
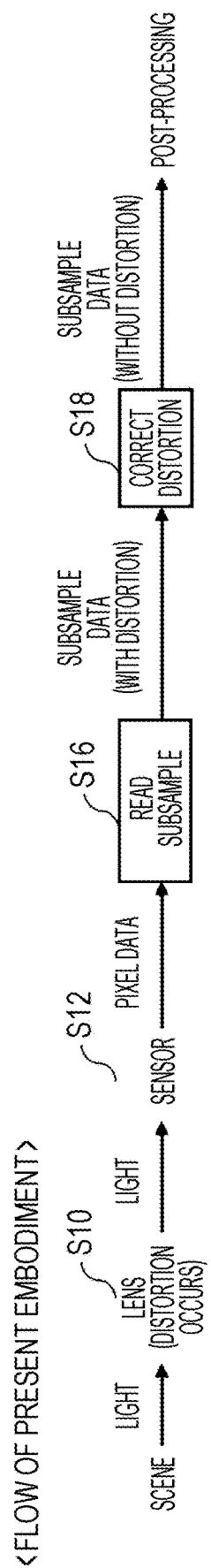
FIG. 28 is a diagram illustrating a processing flow according to the second embodiment.

FIG. 28 is a diagram illustrating a processing flow according to the second embodiment. As illustrated in FIG. 28, in the processing flow according to the present embodiment, a scene is transmitted through the lens of the optical unit 30 (S10). At this time, a position where the scene is concentrated on the sensor unit 10 by the lens suffers distortion in a manner that depends on the position of the scene.

Next, the scene formed as an image is converted into pixel data by the sensor unit 10 (S12), and is sampled and read by the reading unit 110 (S16). The reading unit 110 supplies the sampled image data to the second lens distortion correction unit 125. The second lens distortion correction unit 125 inversely transforms the coordinates (x, y) into coordinates (x1, y1) by $f^{-1}(x, y)$, and transforms the sampled image data (x, y) into image data (x1, y1) in which distortion is corrected (S18). The second lens distortion correction unit 125 supplies the image data (x1, y1) to the feature calculation unit 120. As described above, the use of the point-net type recognizer 52a allows the feature to be calculated as it is from the image data (x1, y1) in which the distortion is corrected. Note that the correspondence between the coordinates (x1, y1) and the coordinates (x, y) may be calculated in advance and stored in the storage unit 114 as a coordinate conversion map. In this case, the use of the coordinate conversion map for coordinate conversion can shorten the calculation time.

FIG. 29 is a flowchart illustrating a flow of processing in the recognition processing unit 12.

First, the reading unit 110 reads out the image data from the sensor unit 10 on the basis of the coordinate information in the reading region information, and supplies the image data to the second lens distortion correction unit 125 (step S200).

Next, the second lens distortion correction unit 125 acquires the lens distortion parameter from the storage unit 114 (step S202). The second lens distortion correction unit 125 performs distortion correction on the coordinates of the reading image data using the lens distortion parameter (step S204). Then, the feature calculation unit 120 calculates a feature from the image data of the coordinates subjected to distortion correction (step S206).

As described above, according to the present embodiment, the second lens distortion correction unit 125 performs distortion correction on the coordinates of the reading image data using the lens distortion parameter. Then, the feature calculation unit 120 calculates a feature from the image data of the coordinates subjected to distortion correction, and performs recognition using the point-net type recognizer 52a of the recognition processing execution unit 124. As a result, the feature can be calculated from the image data in which the lens distortion has been corrected without performing interpolation processing or the like. As a result, the recognition accuracy of the recognition processing in the recognition processing execution unit 124 can be further increased.

Third Embodiment

An information processing system 1 according to a modification of a third embodiment is different from the information processing system 1 according to the second embodiment in that lens distortion is corrected for a read image, and image data after correction corresponding to data of one line before correction is supplied to the recognition processing execution unit 124. Hereinafter, differences from the information processing system 1 according to the second embodiment will be described.

FIG. 30 is a diagram illustrating conventional data that is processed in accordance with the processing flow illustrated in the upper part of FIG. 19. (a) of FIG. 30 illustrates two-dimensional image data read by the reading unit 110. (b) is a diagram illustrating image data obtained by performing, by the second lens distortion correction unit 125, distortion correction on the coordinates of the read image data using the lens distortion parameter. The two-dimensional image data illustrated in (b) corresponds to the image data subjected to the conventional distortion correction illustrated in the middle diagram in FIG. 25. When this data is supplied to the recognition processing execution unit 124 including, for example, a CNN, a problem similar to the problem in the processing illustrated in FIG. 25 occurs.

That is, when the image data illustrated in (b) of FIG. 30 is input as supply image data on a line-by-line basis as in the conventional case, the image data at the lower end of (a) of FIG. 30 is cut out on a line-by-line basis, and the information size decreases accordingly. On the other hand, line data at the center is all configured as supply image data of one row, and the information size is larger than the information size of supply image data in the end region. As a result, the recognition accuracy of the recognition processing execution unit 124 varies in a manner that depends on the position of the line of the image after correction illustrated in (b) of FIG. 30.

Figure 31:
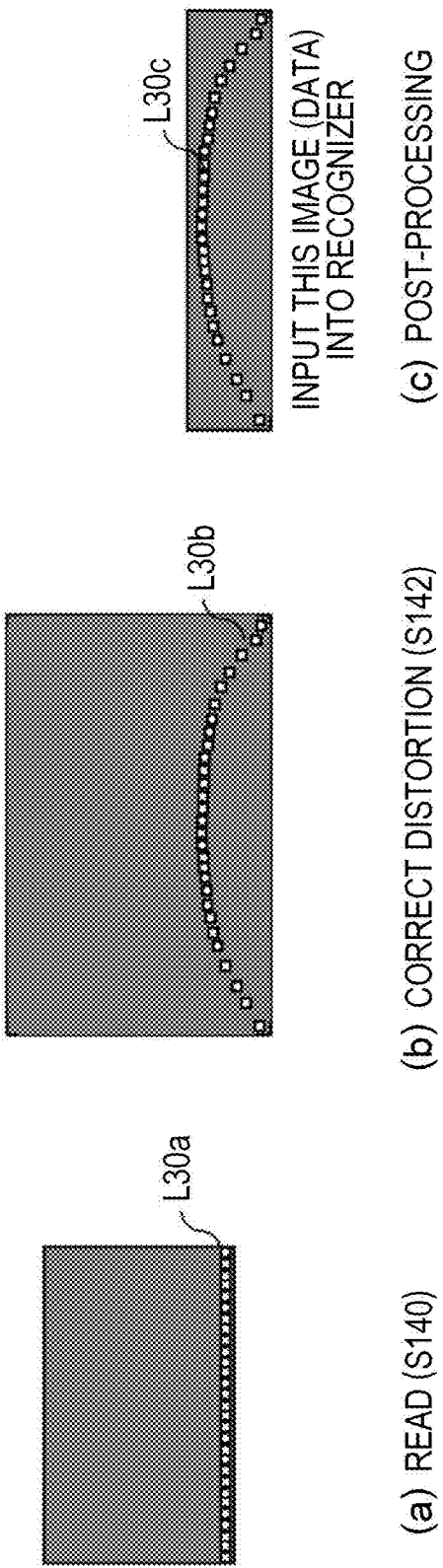
FIG. 31 is a diagram illustrating processing data for use in an information processing system according to a third embodiment.

FIG. 31 is a diagram illustrating processing data for use in the information processing system 1 according to the third embodiment. (a) of FIG. 31 illustrates two-dimensional image data read by the reading unit 110 (see FIG. 26). Data of each row of the two-dimensional image data is linear as indicated by line data L130a. This processing corresponds to S140 of the processing flow illustrated in the upper part of FIG. 19.

(b) is a diagram illustrating image data obtained by performing, by the second lens distortion correction unit 125 (see FIG. 26), distortion correction on the coordinates of the read image data using the lens distortion parameter. As illustrated in (b), the line data L130a is curved after correction as indicated by a line 130b. This processing corresponds to S142 of the processing flow illustrated in the upper part of FIG. 19.

The two-dimensional image data illustrated in (c) is supply image data supplied to the recognition processing execution unit 124 including the CNN according to the present embodiment. Linear line data 130c corresponding to the line 130b is included. The vertical width of the supply image data is changed in accordance with the line data L130a. Furthermore, the value of the region other than the data line 130c is changed to a predetermined value, for example, 0.

That is, as illustrated in (c) of FIG. 26, the feature calculation unit 120 according to the third embodiment calculates a feature from the two-dimensional image data having a vertical width corresponding to the lens distortion parameter and the position of the line data L130a as the original data. That is, the supply image data illustrated in (c) always includes the line data L130c based on the line data L130a.

The recognition processing execution unit 124 (see FIG. 26) according to the third embodiment includes, for example, a CNN learned in accordance with each format of the supply image data illustrated in (c).

As described above, in the present embodiment, image data in a range including the line data L130c corresponding to the line data L130a of one row is supplied to the recognition processing execution unit 124 from the image data in which the lens distortion is corrected. As a result, the image data always including the line data L130c based on the line data L130a is supplied to the recognition processing execution unit 124, and a decrease in the recognition accuracy of the recognition processing execution unit 124 is suppressed.

Fourth Embodiment

An information processing system 1 according to a modification of a fourth embodiment is different from the information processing system 1 according to the second embodiment in that the recognizer of the recognition processing execution unit 124 can be switched in accordance with the lens distortion parameter instead of canceling the lens distortion. Hereinafter, differences from the information processing system 1 according to the second embodiment will be described.

Figure 32:
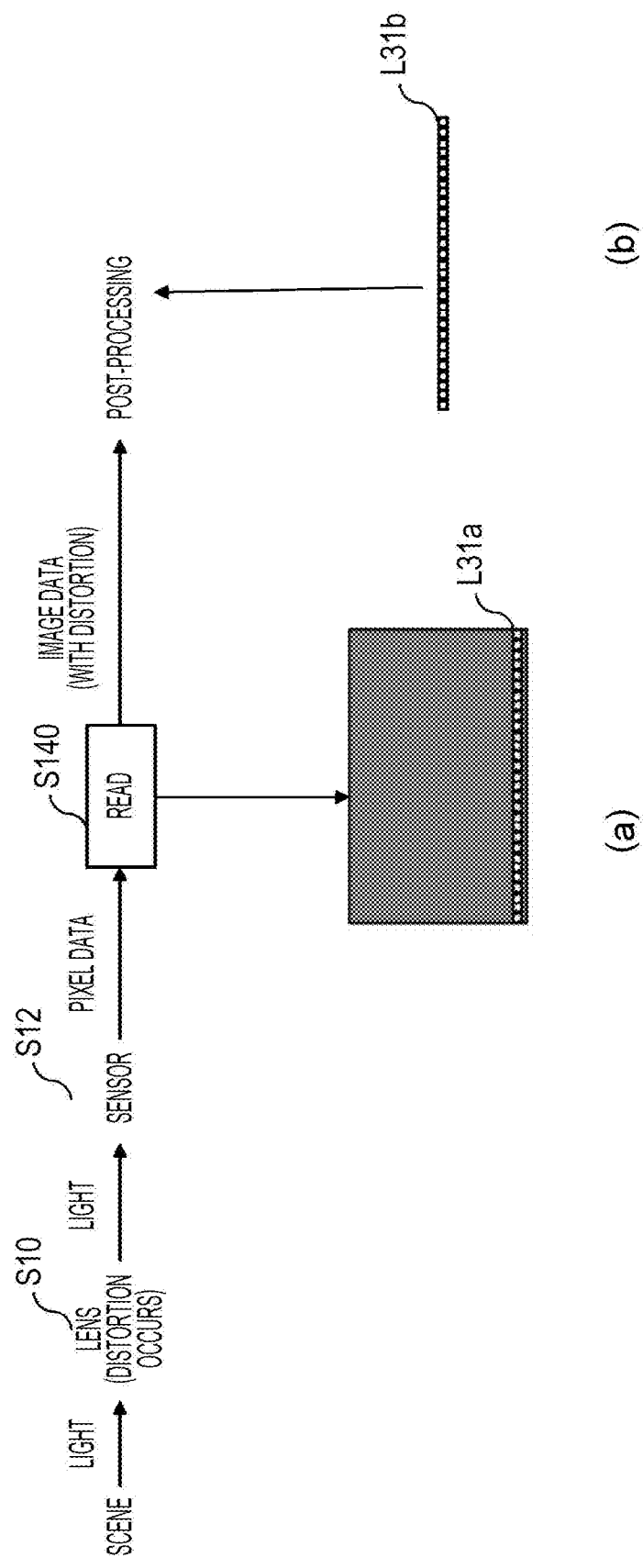
FIG. 32 is a diagram illustrating an example of a processing flow according to a fourth embodiment.

FIG. 32 is a diagram illustrating an example of a processing flow according to the fourth embodiment. As illustrated in FIG. 32, in the processing flow according to the present modification, a scene is transmitted through the lens of the optical unit 30 (S10). At this time, a position where the scene is concentrated on the sensor unit 10 by the lens suffers distortion in a manner that depends on the position of the scene.

Next, the scene formed as an image is converted into pixel data by the sensor unit 10 (S12) and read by the reading unit 110 (S140). The reading unit 110 supplies linearly sampled image data to the second lens distortion correction unit 125. The second lens distortion correction unit 125 supplies image data (x, y) that has not been subjected to distortion correction to the feature calculation unit 120.

The recognition processing execution unit 124 selects the learned CNN recognizer in accordance with the lens distortion parameter, and performs the recognition processing. Each of the plurality of recognizers is learned for a corresponding one of lenses that are different in lens distortion from each other. Furthermore, for example, the CNN recognizer included in the recognition processing execution unit 124 also includes a second recognizer learned for various lenses that are different in lens distortion from each other. The second recognizer is learned so as to have recognition accuracy higher than or equal to a predetermined value even in a case where the lens distortion parameter is unknown. Therefore, the second recognizer is applied to a case where the lens distortion parameter is unknown or a case where there is no recognizer adapted to the distortion parameter. As described above, even in a case where there is no recognizer adapted to the distortion parameter, the use of the second recognizer suppresses a decrease in recognition accuracy.

Figure 33:
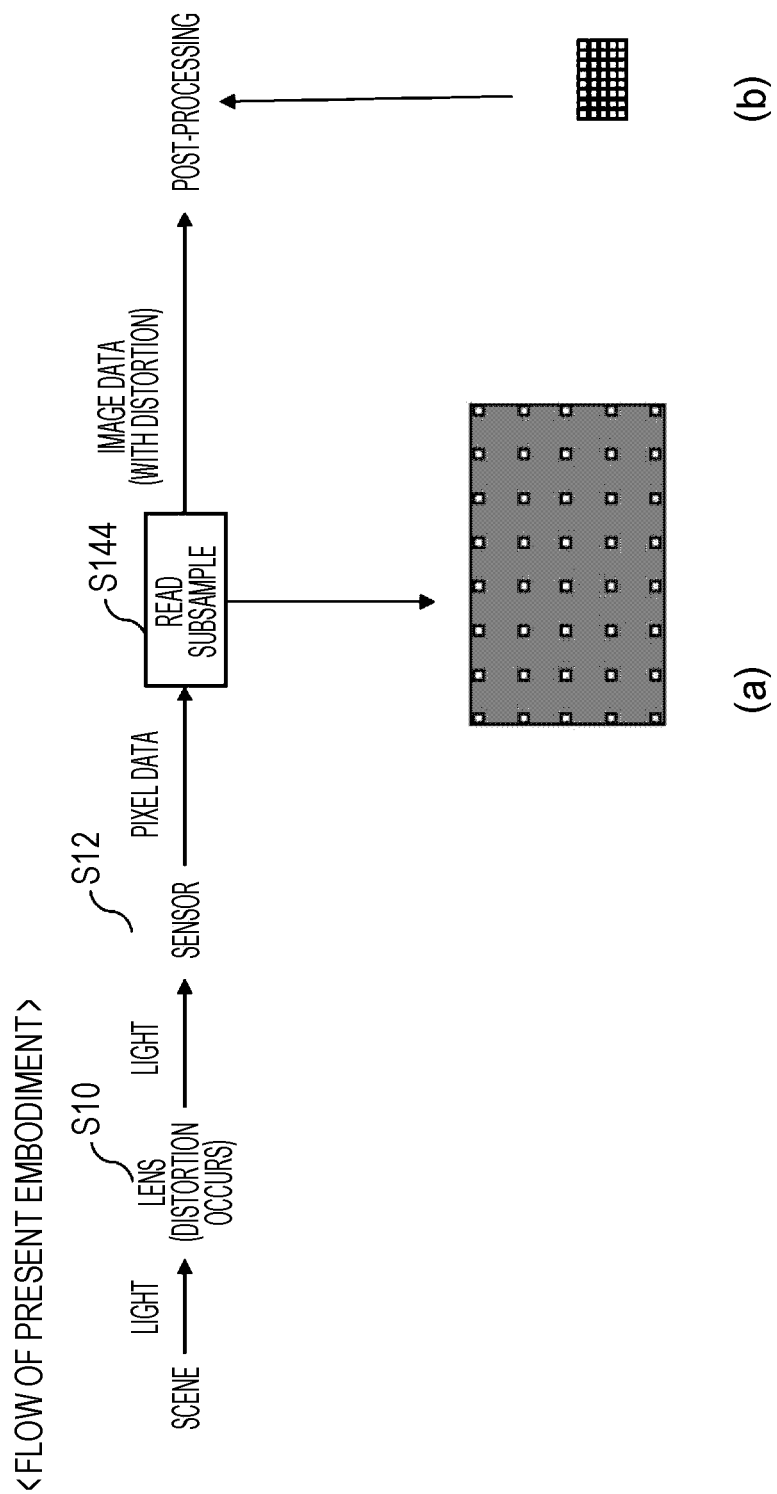
FIG. 33 is a diagram illustrating another example of the processing flow according to the fourth embodiment.

FIG. 33 is a diagram illustrating another example of the processing flow according to the fourth embodiment. As illustrated in FIG. 33, in the processing flow according to the present modification, a scene is transmitted through the lens of the optical unit 30 (S10). At this time, a position where the scene is concentrated on the sensor unit 10 by the lens suffers distortion in a manner that depends on the position of the scene.

Next, the scene formed as an image is converted into pixel data by the sensor unit 10 (S12), and is subsampled and read by the reading unit 110 (S144). The reading unit 110 supplies the subsampled image data to the second lens distortion correction unit 125. The second lens distortion correction unit 125 supplies image data (x, y) that has not been subjected to distortion correction to the feature calculation unit 120.

The recognition processing execution unit 124 selects a CNN recognizer for the subsampled image the CNN recognizer being learned in accordance with the lens distortion parameter, and performs recognition processing. Each of the plurality of recognizers is learned for a corresponding one of lenses that are different in lens distortion from each other. Furthermore, for example, the CNN recognizer included in the recognition processing execution unit 124 also includes a third recognizer for subsampled images, the third recognizer being learned for various lenses that are different in lens distortion from each other. The third recognizer is learned so as to have recognition accuracy higher than or equal to a predetermined value even in a case where the lens distortion parameter is unknown. Therefore, the third recognizer is applied to a case where the lens distortion parameter is unknown or a case where there is no recognizer adapted to the distortion parameter. As described above, even in a case where there is no recognizer adapted to the distortion parameter, the use of the third recognizer suppresses a decrease in recognition accuracy.

As described above, according to the present embodiment, instead of canceling the lens distortion, the recognizer of the recognition processing execution unit 124 is switched in accordance with the lens distortion parameter. As a result, it is possible to suppress a decrease in the recognition rate by using a recognizer adapted to various distortion parameters without correcting the lens distortion.

Fifth Embodiment (3-1. Application Example of Technology of Present Disclosure)

Figure 34:
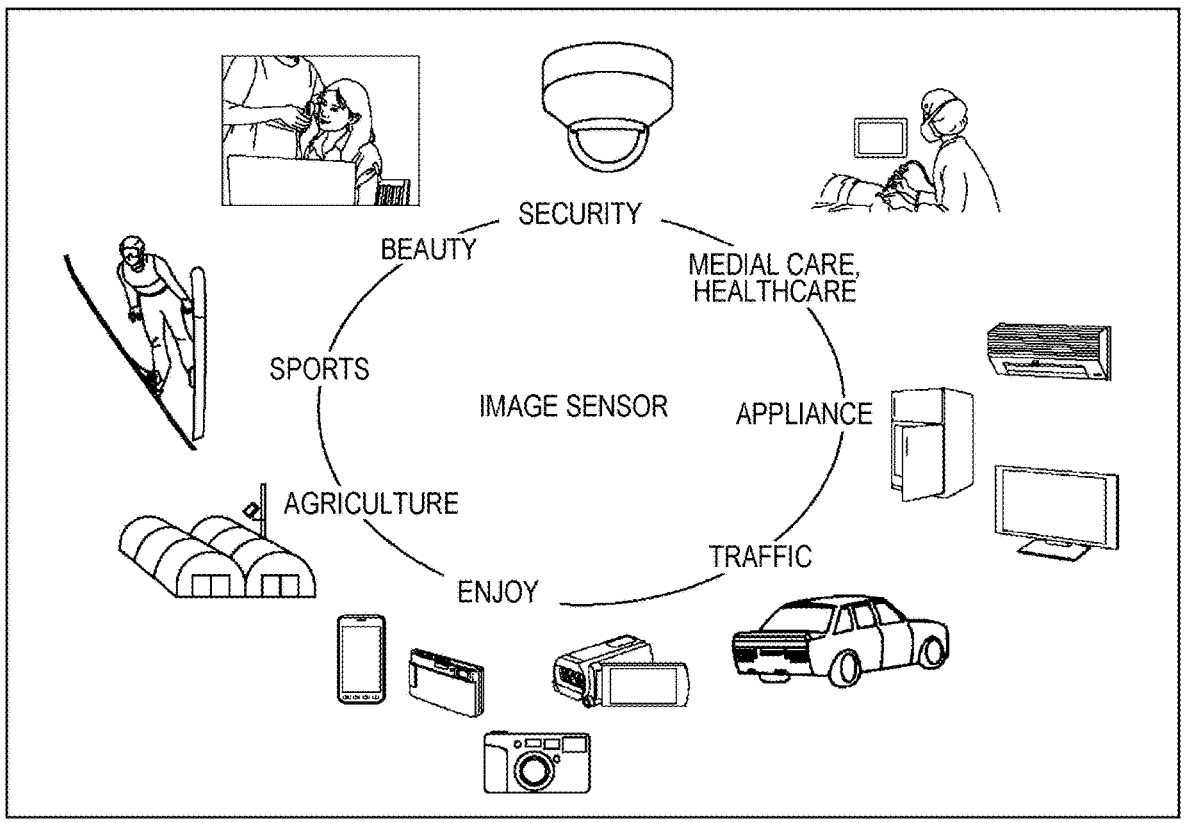
FIG. 34 is a diagram illustrating usage examples of the information processing device according to the first to fourth embodiments.

Next, as two types of embodiments, an application example of the information processing device 2 according to the first to fourth embodiments of the present disclosure will be described. FIG. 34 is a diagram illustrating usage examples of the information processing device 2 according to the first to fourth embodiments. Note that, in the following, in a case where it is not particularly necessary to distinguish, the information processing device 2 will be described as a representative.

The information processing device 2 described above is applicable to, for example, various cases where light such as visible light, infrared light, ultraviolet light, or X-rays is sensed, and recognition processing is performed on the basis of the sensing result as follows.

A device that captures an image to be used for viewing, such as a digital camera and a portable device with a camera function.

A device used for traffic, such as an in-vehicle sensor that captures images of a front view, rear view, surrounding view, inside view, and the like of an automobile for safe driving such as automatic braking and recognition of a driver's condition, a monitoring camera that monitors a traveling vehicle or a road, and a distance measurement sensor that measures a distance between vehicles.

A device used for home electrical appliances such as a television, a refrigerator, and an air conditioner in order to capture an image of a gesture of a user to control an appliance in accordance with the gesture.

A device used for medical care or health care, such as an endoscope and a device that performs angiography by receiving infrared light.

A device used for security, such as a surveillance camera for crime prevention and a camera for personal authentication.

A device used for beauty care, such as a skin measuring instrument that captures an image of skin and a microscope that captures an image of a scalp.

A device used for sports, such as an action camera and a wearable camera used for sports and the like.

A device used for agriculture, such as a camera for monitoring a condition of a field or crops.

(3-2. Application Example to Moving Object)

The technology according to the present disclosure (present technology) is applicable to various products. For example, the technology according to the present disclosure may be implemented as a device installed on any type of moving object such as an automobile, an electric automobile, a hybrid electric automobile, a motorcycle, a bicycle, a personal transporter, a plane, a drone, a ship, and a robot.

Figure 35:
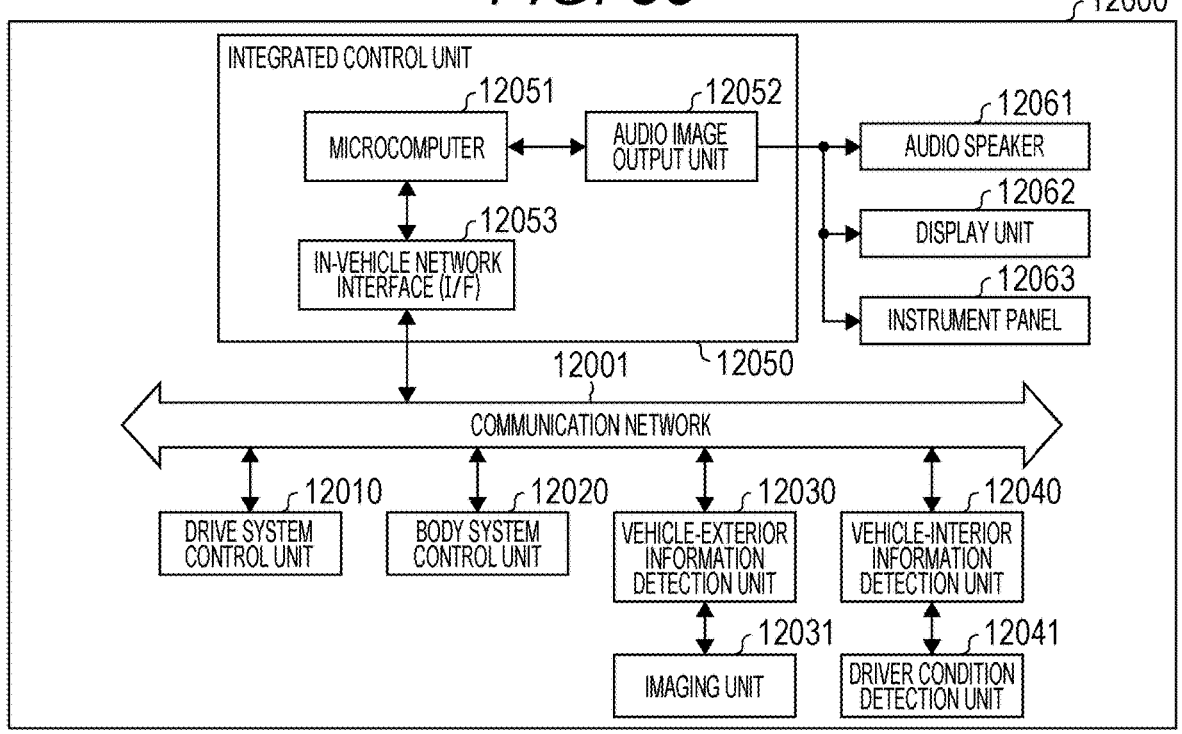
FIG. 35 is a block diagram illustrating an example of a schematic configuration of a vehicle control system.

FIG. 35 is a block diagram illustrating a schematic configuration example of a vehicle control system that is an example of a moving object control system to which the technology according to the present disclosure is applicable.

The vehicle control system 12000 includes a plurality of electronic control units connected over a communication network 12001. In the example illustrated in FIG. 35, the vehicle control system 12000 includes a drive system control unit 12010, a body system control unit 12020, a vehicle-exterior information detection unit 12030, a vehicle-interior information detection unit 12040, and an integrated control unit 12050. Furthermore, as functional components of the integrated control unit 12050, a microcomputer 12051, an audio image output unit 12052, and an in-vehicle network interface (I/F) 12053 are illustrated.

The drive system control unit 12010 controls operation of devices related to a drive system of a vehicle in accordance with various programs. For example, the drive system control unit 12010 functions as a control device of a driving force generation device for generating a driving force of the vehicle such as an internal combustion engine or a driving motor, a driving force transmission mechanism for transmitting the driving force to wheels, a steering mechanism for adjusting a steering angle of the vehicle, a braking device for generating a braking force of the vehicle, and the like.

The body system control unit 12020 controls operation of various devices installed on the vehicle body in accordance with various programs. For example, the body system control unit 12020 functions as a control device of a keyless entry system, a smart key system, a power window device, or various lamps such as a headlamp, a tail lamp, a brake lamp, a turn signal, or a fog lamp. In this case, radio waves transmitted from a portable device that substitutes for a key or signals of various switches can be input to the body system control unit 12020. Upon receipt of such radio waves or signals, the body system control unit 12020 controls a door lock device, the power window device, the lamps, or the like of the vehicle.

The vehicle-exterior information detection unit 12030 detects information regarding the exterior of the vehicle on which the vehicle control system 12000 is installed. For example, an imaging unit 12031 is connected to the vehicle-exterior information detection unit 12030. The vehicle-exterior information detection unit 12030 causes the imaging unit 12031 to capture an image of an outside view seen from the vehicle, and receives the captured image data. The vehicle-exterior information detection unit 12030 may perform object detection processing of detecting an object such as a person, a vehicle, an obstacle, a sign, or a character on a road surface or distance detection processing of detecting a distance to such an object on the basis of the received image.

The imaging unit 12031 is an optical sensor that receives light and outputs an electric signal corresponding to the intensity of the received light. The imaging unit 12031 can output the electric signal as an image or can output the electric signal as distance information. Furthermore, the light received by the imaging unit 12031 may be visible light or invisible light such as infrared rays.

The vehicle-interior information detection unit 12040 detects vehicle-interior information. For example, a driver condition detection unit 12041 that detects a condition of a driver is connected to the vehicle-interior information detection unit 12040. The driver condition detection unit 12041 may include, for example, a camera that captures an image of the driver, and the vehicle-interior information detection unit 12040 may calculate a degree of fatigue or a degree of concentration of the driver or may determine whether or not the driver is dozing on the basis of the detection information input from the driver condition detection unit 12041.

The microcomputer 12051 may calculate a control target value of the driving force generation device, the steering mechanism, or the braking device on the basis of the information regarding the inside and outside of the vehicle acquired by the vehicle-exterior information detection unit 12030 or the vehicle-interior information detection unit 12040, and output a control command to the drive system control unit 12010. For example, the microcomputer 12051 can perform coordinated control for the purpose of implementing a function of an advanced driver assistance system (ADAS) including vehicle collision avoidance or impact mitigation, follow-up traveling based on an inter-vehicle distance, traveling with the vehicle speed maintained, vehicle collision warning, vehicle lane departure warning, or the like.

Furthermore, the microcomputer 12051 can perform coordinated control for the purpose of automated driving or the like in which the vehicle autonomously travels without depending on driver's operation by controlling the driving force generation device, the steering mechanism, the braking device, or the like on the basis of the information regarding surroundings of the vehicle acquired by the vehicle-exterior information detection unit 12030 or the vehicle-interior information detection unit 12040.

Furthermore, the microcomputer 12051 can output a control command to the body system control unit 12020 on the basis of the vehicle-exterior information acquired by the vehicle-exterior information detection unit 12030. For example, the microcomputer 12051 can perform coordinated control for the purpose of preventing glare, such as switching from a high beam to a low beam, by controlling the headlamp in accordance with the position of a preceding vehicle or an oncoming vehicle detected by the vehicle-exterior information detection unit 12030.

The audio image output unit 12052 transmits an output signal of at least one of a sound or an image to an output device capable of visually or audibly notifying the occupant of the vehicle or the outside of the vehicle of information. In the example illustrated in FIG. 35, an audio speaker 12061, a display unit 12062, and an instrument panel 12063 are illustrated as output devices. The display unit 12062 may include, for example, at least one of an on-board display or a head-up display.

Figure 36:
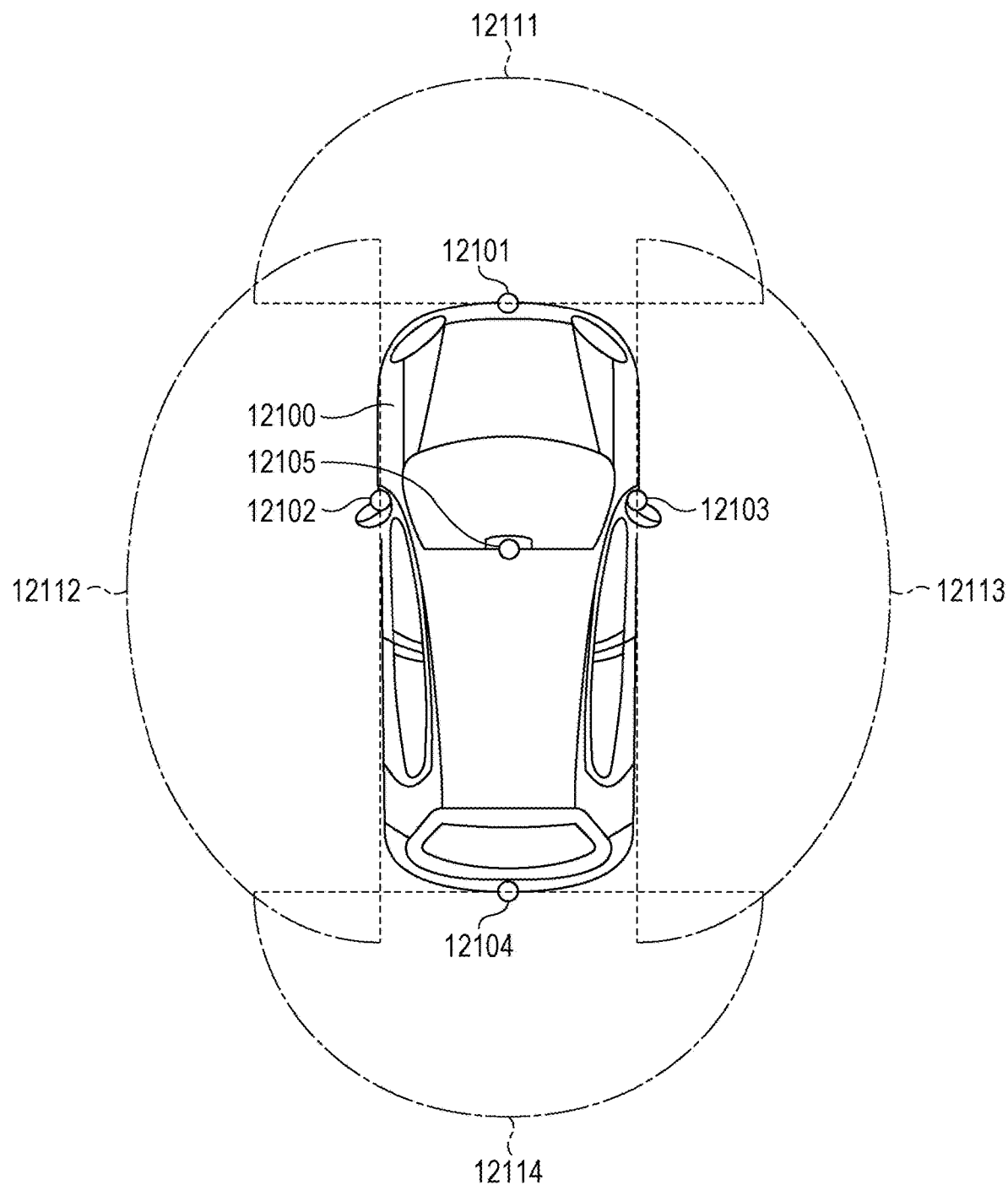
FIG. 36 is an explanatory diagram illustrating an example of installation positions of a vehicle-exterior information detection unit and an imaging unit.

FIG. 36 is a diagram illustrating an example of an installation position of the imaging unit 12031.

In FIG. 36, a vehicle 12100 includes imaging units 12101, 12102, 12103, 12104, 12105 as the imaging unit 12031.

The imaging units 12101, 12102, 12103, 12104, 12105 are provided, for example, at least one of a front nose, a side mirror, a rear bumper, a back door, or an upper portion of a windshield in a vehicle interior of the vehicle 12100. The imaging unit 12101 provided at the front nose and the imaging unit 12105 provided at the upper portion of the windshield in the vehicle interior mainly capture an image of a front view seen from the vehicle 12100. The imaging units 12102, 12103 provided at the side mirrors mainly capture images of side views seen from the vehicle 12100. The imaging unit 12104 provided at the rear bumper or the back door mainly capture an image of a rear view seen from the vehicle 12100. The images of the front view acquired by the imaging units 12101, 12105 are mainly used for detecting a preceding vehicle, a pedestrian, an obstacle, a traffic light, a traffic sign, a lane, or the like.

Note that FIG. 36 illustrates an example of respective imaging ranges of the imaging units 12101 to 12104. An imaging range 12111 indicates an imaging range of the imaging unit 12101 provided at the front nose, imaging ranges 12112, 12113 indicate imaging ranges of the imaging units 12102, 12103 provided at the side mirrors, respectively, and an imaging range 12114 indicates an imaging range of the imaging unit 12104 provided at the rear bumper or the back door. For example, it is possible to obtain a bird's-eye view image of the vehicle 12100 by superimposing image data captured by the imaging units 12101 to 12104 on top of one another.

At least one of the imaging units 12101 to 12104 may have a function of acquiring distance information. For example, at least one of the imaging units 12101 to 12104 may be a stereo camera including a plurality of imaging elements, or may be an imaging element having pixels for phase difference detection.

For example, the microcomputer 12051 obtains a distance to a three-dimensional object in each of the imaging ranges 12111 to 12114 and a temporal change in the distance (speed relative to the vehicle 12100) on the basis of the distance information obtained from the imaging units 12101 to 12104, so as to extract, as a preceding vehicle, a three-dimensional object traveling at a predetermined speed (for example, 0 km/h or more) in substantially the same direction as the vehicle 12100, in particular, the closest three-dimensional object on a traveling path of the vehicle 12100. Furthermore, the microcomputer 12051 can set in advance an inter-vehicle distance that needs to be maintained relative to the preceding vehicle, and perform automated deceleration control (including follow-up stop control), automated acceleration control (including follow-up start control), or the like. As described above, it is possible to perform coordinated control for the purpose of, for example, automated driving in which a vehicle autonomously travels without depending on the operation of the driver.

For example, on the basis of the distance information obtained from the imaging units 12101 to 12104, the microcomputer 12051 can classify three-dimensional object data regarding three-dimensional objects into a two-wheeled vehicle, a standard-sized vehicle, a large-sized vehicle, a pedestrian, and other three-dimensional objects such as a utility pole and extract the three-dimensional object data for use in automated avoidance of obstacles. For example, the microcomputer 12051 identifies obstacles around the vehicle 12100 as an obstacle that can be visually recognized by the driver of the vehicle 12100 and an obstacle that is difficult to be visually recognized. Then, the microcomputer 12051 determines a collision risk indicating a risk of collision with each obstacle, and when the collision risk is greater than or equal to a set value and there is a possibility of collision, the microcomputer 12051 can give driver assistance for collision avoidance by issuing an alarm to the driver via the audio speaker 12061 or the display unit 12062 or performing forced deceleration or avoidance steering via the drive system control unit 12010.

At least one of the imaging units 12101 to 12104 may be an infrared camera that detects infrared rays. For example, the microcomputer 12051 can recognize a pedestrian by determining whether or not the pedestrian is present in the images captured by the imaging units 12101 to 12104. Such pedestrian recognition is performed by, for example, a procedure of extracting feature points in the images captured by the imaging units 12101 to 12104 as infrared cameras, and a procedure of performing pattern matching processing on a series of feature points indicating an outline of an object to determine whether or not the object is a pedestrian. When the microcomputer 12051 determines that a pedestrian is present in the images captured by the imaging units 12101 to 12104 and recognizes the pedestrian, the audio image output unit 12052 controls the display unit 12062 to display the images with a square contour line for emphasis on the recognized pedestrian superimposed on the images. Furthermore, the audio image output unit 12052 may control the display unit 12062 to display an icon or the like indicating a pedestrian at a desired position.

An example of the vehicle control system to which the technology according to the present disclosure is applicable has been described above. The technology according to the present disclosure is applicable to the imaging unit 12031 and the vehicle-exterior information detection unit 12030 among the above-described components. Specifically, for example, the sensor unit 10 of the information processing device 2 is applied to the imaging unit 12031, and the recognition processing unit 12 is applied to the vehicle-exterior information detection unit 12030. The recognition result output from the recognition processing unit 12 is passed to the integrated control unit 12050 over the communication network 12001, for example.

As described above, applying the technology according to the present disclosure to the imaging unit 12031 and the vehicle-exterior information detection unit 12030 makes it possible to perform recognition of an object at a short distance and recognition of an object at a long distance and to perform recognition of objects at a short distance with high simultaneity, so that it is possible to give driver assistance in a more reliable manner.

Note that the effects described herein are merely examples and are not limited, and other effects may be provided.

Note that the present technology may have the following configurations.

(1)

An information processing device including:

a reading unit configured to set, as a read unit, a part of a pixel region in which a plurality of pixels is arranged in a two-dimensional array, and control reading of a pixel signal from a pixel included in the pixel region; and a correction unit configured to correct the read unit on the basis of a lens distortion parameter and cause the reading unit to read the pixel signal.

(2)

In the information processing device according to (1), the correction unit corrects the read unit by applying inverse transform of distortion correction to the read unit on the basis of the lens distortion parameter.

(3)

The information processing device according to (1), further including a feature calculation unit configured to calculate a feature on the basis of the pixel signal that has been corrected and read on the basis of the distortion parameter.

(4)

The information processing device according to (3), further including a recognition processing unit configured to perform recognition processing on the basis of the feature.

(5)

In the information processing device according to (1), the correction unit calculates a coordinate position obtained by correcting a linear coordinate sequence on the basis of the lens distortion parameter, and the reading unit controls reading of the pixel signal based on the corrected coordinate position.

(6)

In the information processing device according to (1), the correction unit calculates a coordinate position obtained by correcting a subsampling coordinate group on the basis of the lens distortion parameter, and the reading unit controls reading of the pixel signal based on the corrected coordinate position.

(7)

An information processing device including:

a reading unit configured to set, as a reading pixel, a part of a pixel region in which a plurality of pixels is arranged in a two-dimensional array, and control reading of a pixel signal from a pixel included in the pixel region; and a second correction unit configured to correct coordinates of the pixel signal from the pixel included in the pixel region on the basis of a lens distortion parameter.

(8)

The information processing device according to (7), further including a recognition processing unit configured to perform recognition processing on the basis of the corrected pixel signal.

(9)

In the information processing device according to (8), the recognition processing unit includes a point-net type recognizer.

(10)

In the information processing device according to (8), the second correction unit supplies, to the recognition processing execution unit, the corrected pixel signal corresponding to a range corresponding to each row of the pixel signal read by the reading unit.

(11)

An information processing device including:

a reading unit configured to set, as a reading pixel, a part of a pixel region in which a plurality of pixels is arranged in a two-dimensional array, and control reading of a pixel signal from a pixel included in the pixel region; and a recognition processing execution unit including a plurality of recognizers learned according to a plurality of lenses, the recognition processing execution unit being configured to perform recognition processing on the basis of the read pixel signal, in which the recognition processing execution unit performs recognition processing using a recognizer according to imaging of the pixel signal.

(12)

In the information processing device according to (11), the recognition processing execution unit performs recognition processing using a recognizer corresponding to an optical system used for imaging of the pixel signal.

(13)

In the information processing device according to (11), the recognition processing execution unit performs recognition processing using a recognizer learned for a plurality of different optical systems.

(14)

An information processing system including:

a sensor unit in which a plurality of pixels is arranged in a two-dimensional array; and a recognition processing unit, in which the recognition processing unit includes:

a reading unit configured to set, as a reading pixel, a part of a pixel region of the sensor unit, and control reading of a pixel signal from a pixel included in the pixel region; and a correction unit configured to correct the read unit on the basis of a lens distortion parameter and cause the reading unit to read the pixel signal.

(15)

An information processing system including:

a sensor unit in which a plurality of pixels is arranged in a two-dimensional array; and a recognition processing unit, in which the recognition processing unit includes:

a reading unit configured to set, as a reading pixel, a part of a pixel region in which a plurality of pixels is arranged in a two-dimensional array, and control reading of a pixel signal from a pixel included in the pixel region; and a second correction unit configured to correct coordinates of the pixel signal from the pixel included in the pixel region on the basis of a lens distortion parameter.

(16)

An information processing system including:

a sensor unit in which a plurality of pixels is arranged in a two-dimensional array; and a recognition processing unit, in which the recognition processing unit includes:

a reading unit configured to set, as a reading pixel, a part of a pixel region in which a plurality of pixels is arranged in a two-dimensional array, and control reading of a pixel signal from a pixel included in the pixel region; and a recognition processing execution unit including a plurality of recognizers learned according to a plurality of lenses, the recognition processing execution unit being configured to perform recognition processing on the basis of the read pixel signal, in which the recognition processing execution unit performs recognition processing using a recognizer according to imaging of the pixel signal.

(17)

An information processing method including:

a reading process of setting, as a read unit, a part of a pixel region in which a plurality of pixels is arranged in a two-dimensional array, and controlling reading of a pixel signal from a pixel included in the pixel region; and a correcting process of correcting the read unit on the basis of a lens distortion parameter and causing the reading unit to read the pixel signal.

(18)

An information processing method including:

a reading process of setting, as a reading pixel, a part of a pixel region in which a plurality of pixels is arranged in a two-dimensional array, and controlling reading of a pixel signal from a pixel included in the pixel region; and a second correcting process of correcting coordinates of the pixel signal from the pixel included in the pixel region on the basis of a lens distortion parameter.

(19)

An information processing method including:

a reading process of setting, as a reading pixel, a part of a pixel region in which a plurality of pixels is arranged in a two-dimensional array, and controlling reading of a pixel signal from a pixel included in the pixel region; and a recognition processing execution process of performing recognition processing on the basis of the read pixel signal by using a plurality of recognizers learned according to a plurality of lenses, in which in the recognition processing execution process, recognition processing is performed using a recognizer according to imaging of the pixel signal.

(20)

A program for causing a computer to execute:

a reading process of setting, as a read unit, a part of a pixel region in which a plurality of pixels is arranged in a two-dimensional array, and controlling reading of a pixel signal from a pixel included in the pixel region; and a correcting process of correcting the read unit on the basis of a lens distortion parameter and reading the pixel signal.

(21)

A program for causing a computer to execute:

a reading process of setting, as a reading pixel, a part of a pixel region in which a plurality of pixels is arranged in a two-dimensional array, and controlling reading of a pixel signal from a pixel included in the pixel region; and a second correcting process of correcting coordinates of the pixel signal from the pixel included in the pixel region on the basis of a lens distortion parameter.

(22)

A program for causing a computer to execute:

a reading process of setting, as a reading pixel, a part of a pixel region in which a plurality of pixels is arranged in a two-dimensional array, and controlling reading of a pixel signal from a pixel included in the pixel region; and a recognition processing execution process of performing recognition processing on the basis of the read pixel signal by using a plurality of recognizers learned according to a plurality of lenses, in which in the recognition processing execution process, recognition processing is performed using a recognizer according to imaging of the pixel signal.

REFERENCE SIGNS LIST

1 Information processing system
2 Information processing device 20 Sensor unit
12 Recognition processing unit
110 Reading unit
112 First lens distortion inverse correction unit (correction unit)
120 Feature calculation unit
124 Recognition processing execution unit
125 Second lens distortion correction unit (second correction unit)

The invention claimed is:

1. An information processing device comprising:
circuitry configured to
set, as a read unit, a part of a pixel region in which a plurality of pixels is arranged in a two-dimensional array,
read a pixel signal from a pixel included in the pixel region,
correct the read unit based on a lens distortion parameter and read the pixel signal, and
calculate a feature based on the pixel signal that has been read with the read unit being corrected based on the lens distortion parameter.

2. The information processing device according to claim 1, wherein
the circuitry is further configured to correct the read unit by applying inverse transform of distortion correction to the read unit based on the lens distortion parameter.

3. The information processing device according to claim 1, wherein
the circuitry is further configured to perform recognition processing based on the feature.

4. The information processing device according to claim 1, wherein
the circuitry is further configured to calculate a corrected coordinate position obtained by correcting a linear coordinate sequence based on the lens distortion parameter, and read the pixel signal based on the corrected coordinate position.

5. The information processing device according to claim 1, wherein
the circuitry is further configured to calculate a corrected coordinate position obtained by correcting a subsampling coordinate group based on the lens distortion parameter, and read the pixel signal based on the corrected coordinate position.

6. The information processing device according to claim 1, wherein
the circuitry is further configured to correct coordinates of the pixel signal read from the pixel included in the pixel region based on the lens distortion parameter.

7. The information processing device according to claim 6, wherein
the circuitry is further configured to perform recognition processing based on the pixel signal whose coordinates have been corrected.

8. The information processing device according to claim 7, wherein
the circuitry is further configured to include a point-net type recognizer.

9. The information processing device according to claim 7, wherein
the circuitry is further configured to perform the recognition processing based on the pixel signal whose coordinates have been corrected, corresponding to a range corresponding to each row of the pixel signal that has been read.

10. The information processing device according to claim 1, wherein
the circuitry is further configured to include a plurality of recognizers learned according to a plurality of lenses, and perform recognition processing based on the pixel signal that is read,
using one of the plurality of recognizers according to imaging of the pixel signal.

11. The information processing device according to claim 10, wherein
the circuitry is further configured to perform the recognition processing using one of the plurality of recognizers corresponding to an optical system used for imaging of the pixel signal.

12. The information processing device according to claim 10, wherein
the circuitry is further configured to perform the recognition processing using one of the plurality of recognizers learned for a plurality of different optical systems.

13. An information processing system comprising:
an image sensor in which a plurality of pixels is arranged in a two-dimensional array; and
circuitry, wherein
the circuitry is configured to
set, as a read unit, a part of a pixel region of the image sensor,
read a pixel signal from a pixel included in the pixel region,
correct the read unit based on lens distortion parameter and read the pixel signal,
wherein
the circuitry is further configured to include a plurality of recognizers learned according to a plurality of lenses, and perform recognition processing based on the pixel signal that is read, using one of the plurality of recognizers according to imaging of the pixel signal.

14. The information processing system according to claim 13, wherein
the circuitry is further configured to correct coordinates of the pixel signal read from the pixel included in the pixel region based on the lens distortion parameter.

15. An information processing method comprising:
setting, as a read unit, a part of a pixel region in which a plurality of pixels is arranged in a two-dimensional array;
reading a pixel signal from a pixel included in the pixel region;
correcting the read unit based on a lens distortion parameter and reading the pixel signal;
performing recognition processing based on the pixel signal that is read, by using a plurality of recognizers learned according to a plurality of lenses, wherein
the recognition processing is performed using one of the plurality of recognizers according to imaging of the pixel signal.

16. The information processing method according to claim 15, further comprising:
correcting coordinates of the pixel signal read from the pixel included in the pixel region based on the lens distortion parameter.

\* \* \* \* \*